United States Patent
Kamiya et al.

(10) Patent No.: US 8,418,253 B2
(45) Date of Patent: Apr. 9, 2013

(54) APPLICATION DATA USAGE MANAGEMENT SYSTEM FOR AN ELECTRONIC DEVICE

(75) Inventors: Dai Kamiya, Tokyo (JP); Kazuhiro Yamada, Yokohama (JP); Takashi Kondo, Tokyo (JP); Naoki Yamane, Tokyo (JP); Yutaka Sumi, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 10/515,399

(22) PCT Filed: May 19, 2003

(86) PCT No.: PCT/JP03/06220
§ 371 (c)(1),
(2), (4) Date: Jul. 20, 2005

(87) PCT Pub. No.: WO03/098438
PCT Pub. Date: Nov. 27, 2003

(65) Prior Publication Data
US 2006/0112268 A1    May 25, 2006

(30) Foreign Application Priority Data

May 20, 2002    (JP) ................................ 2002-145280

(51) Int. Cl.
  *G06F 7/04*     (2006.01)
  *G06F 17/30*    (2006.01)
  *H04N 7/16*     (2011.01)
(52) U.S. Cl.
  USPC ................... 726/26; 726/28; 726/29; 726/30; 713/163; 713/164; 707/782; 707/783; 707/784; 707/785; 707/715; 705/51; 705/52; 705/56
(58) Field of Classification Search ............. 726/26–30; 713/163, 164; 705/51–56
  See application file for complete search history.

(56) References Cited

U.S. PATENT DOCUMENTS 6,092,194 A    7/2000  Touboul ....................... 713/200
6,138,235 A    10/2000 Lipkin et al.
(Continued)

FOREIGN PATENT DOCUMENTS

EP    0 969 366 A1    1/2000
EP    1 227 386 A1    7/2002
(Continued)

OTHER PUBLICATIONS

Chinese Office Action issued Jul. 7, 2006.
(Continued)

*Primary Examiner* — Nathan Flynn
*Assistant Examiner* — Bryan Wright
(74) *Attorney, Agent, or Firm* — Brinks Hofer Gilson & Lione

(57) ABSTRACT

An IP server sends e-mail to a mobile device MS. This e-mail includes an application specifier that specifies startup of a Java application stored in mobile device MS and a data specifier that includes data used in operations executed by mobile device MS in accordance with a Java application. On the other hand, the ADF for the Java application stored in mobile device MS includes trusted source data containing a plurality of e-mail addresses that indicate trusted origins. Mobile device MS compares the e-mail transmission origin address with the trusted source data. Mobile device MS, only in the case where the transmission origin address of the received e-mail is included in the trusted source data, starts up a Java application based on an application specifier included in said e-mail, and uses data included in said data specifier in operations executed by that Java application.

19 Claims, 20 Drawing Sheets

U.S. PATENT DOCUMENTS

| | | | |
|---|---|---|---|
| 6,289,464 B1 * | 9/2001 | Wecker et al. | 713/300 |
| 6,367,012 B1 | 4/2002 | Atkinson et al. | 713/176 |
| 6,453,369 B1 | 9/2002 | Imamura et al. | 710/36 |
| 6,499,109 B1 | 12/2002 | Balasubramaniam et al. | 713/201 |
| 6,515,575 B1 | 2/2003 | Kataoka | 340/5.8 |
| 6,766,353 B1 * | 7/2004 | Lin et al. | 709/203 |
| 6,826,690 B1 | 11/2004 | Hind et al. | 713/186 |
| 6,985,887 B1 | 1/2006 | Sunstein et al. | 705/51 |
| 7,194,761 B1 | 3/2007 | Champagne | 726/6 |
| 7,231,657 B2 | 6/2007 | Honarvar et al. | 726/2 |
| 7,260,726 B1 | 8/2007 | Doe et al. | 713/189 |
| 7,263,610 B2 | 8/2007 | Parker et al. | 713/163 |
| 7,310,307 B1 | 12/2007 | Das et al. | 370/229 |
| 7,596,602 B2 * | 9/2009 | Ellman | 709/206 |
| 7,684,792 B2 * | 3/2010 | Lundblade et al. | 455/425 |
| 2002/0002703 A1 | 1/2002 | Baentsch et al. | 717/11 |
| 2002/0123336 A1 * | 9/2002 | Kamada | 455/420 |
| 2002/0137539 A1 * | 9/2002 | Takahashi et al. | 455/550 |
| 2003/0060189 A1 * | 3/2003 | Minear et al. | 455/411 |
| 2003/0135586 A1 * | 7/2003 | Minborg et al. | 709/219 |
| 2003/0236867 A1 | 12/2003 | Natsuno et al. | 709/220 |
| 2004/0073580 A1 * | 4/2004 | Nakayama et al. | 707/201 |
| 2005/0021792 A1 | 1/2005 | Nishida et al. | 370/252 |

FOREIGN PATENT DOCUMENTS

| | | | |
|---|---|---|---|
| GB | 2365561 A | | 2/2002 |
| JP | H60-191336 A | | 9/1985 |
| JP | H05-274399 A | | 10/1993 |
| JP | H10-083310 | | 3/1998 |
| JP | 2000-010782 A | | 1/2000 |
| JP | 2000-029883 A | | 1/2000 |
| JP | 2001-344032 | | 12/2001 |
| JP | 2002-116838 | | 4/2002 |
| JP | 2002-152196 A | | 5/2002 |
| JP | 2002-514326 | | 5/2002 |
| JP | 2002-312215 A | | 10/2002 |
| TW | 400489 | | 8/2000 |
| WO | WO 98/21683 A2 | | 5/1998 |
| WO | WO 02/25409 A2 | | 3/2002 |
| WO | WO 02/37287 A1 | | 5/2002 |
| WO | WO02/093361 | | 11/2002 |

OTHER PUBLICATIONS

Office Action mailed Oct. 21, 2008, in Japanese Patent Application No. 2002-145280, with full English translation (6 pages).

Windows Start—Windows can be completely understood on a subject basis, Japan, Mainichi Communications, Inc., Mar. 29, 2002, vol. 7, No. 8, pp. 38-75.

Japanese Office Action mailed Apr. 25, 2006, in Japanese Patent Application No. JP2003-091527, with English translation, 4 pages.

Japanese Office Action mailed Jul. 25, 2006, in Japanese Patent Application No. JP2003-091527, with English translation, 4 pages.

Office Action dated Jul. 20, 2009, issued in U.S. Appl. No. 10/810,500 (19 pgs).

Japanese Office Action dated Jun. 23, 2009, issued in Japanese Patent Application No. 2008-325919, with English translation (6 pages).

European Office Action, dated Jul. 12, 2011, in European Patent Application No. 03730525.7, (6 pgs.).

European Extended Search Report, dated Jul. 18, 2011, in European Patent Application No. 11150177.1, (6 pgs.).

European Examination Report, dated Feb. 13, 2012, issued in European Patent Application No. 11150177.1, European Patent Office, Munich, Germany; (5 pgs.).

European Extended Search Report, dated Jul. 18, 2011, in European Patent Application No. 11150178.9, (7 pgs.).

European Examination Report, dated Apr. 2, 2012, issued in European Patent Application No. 11150178.9, European Patent Office, Munich, Germany; (7 pgs.).

* cited by examiner

FIG. 3

Received: from • • •
Date: ?, ? ? 2000 10:06:28
From:?? <??@??.ne.jp>
To: aa@aa.ne.jp
Subject: DATA IMPORT
This is a multi-part message in MIME
format.

-=_NextPart_000_000B_01C0A0A7.F7E5F7C0
Content-Type: text/plain;
THIS MAIL INCLUDES DATA THAT CAN BE USED IN YOUR DOWNLOADED Java APPLICATION. PLEASE PRESS THE '*' BUTTON.
-=_NextPart_000_000B_01C0A0A7.F7E5F7C0
Content-Type: text/enriched;
<MOVE><param>"http://www.??.co.jp/$$a">
</param></MOVE>
<IMPORT><param>"??"</param></IMPORT>

| URI | MAIL ADDRESS |
|---|---|
| http://www.??.ne.jp/$$a | aa@aa.ne.jp |
|  | bb@bb.ne.jp |
|  | ⋮ |
| http://www.??.ne.jp/%%a | cc@cc.ne.jp |
|  | ⋮ |
| ⋮ | ⋮ |

| URI | MEMORY ADDRESS |
|---|---|
| http://www.##.ne.jp/$$a | #0001 |
| http://www.??.ne.jp/%%a | #0002 |
| http://www.%%.ne.jp/##a | #0003 |
| ⋮ | ⋮ |

TBL1

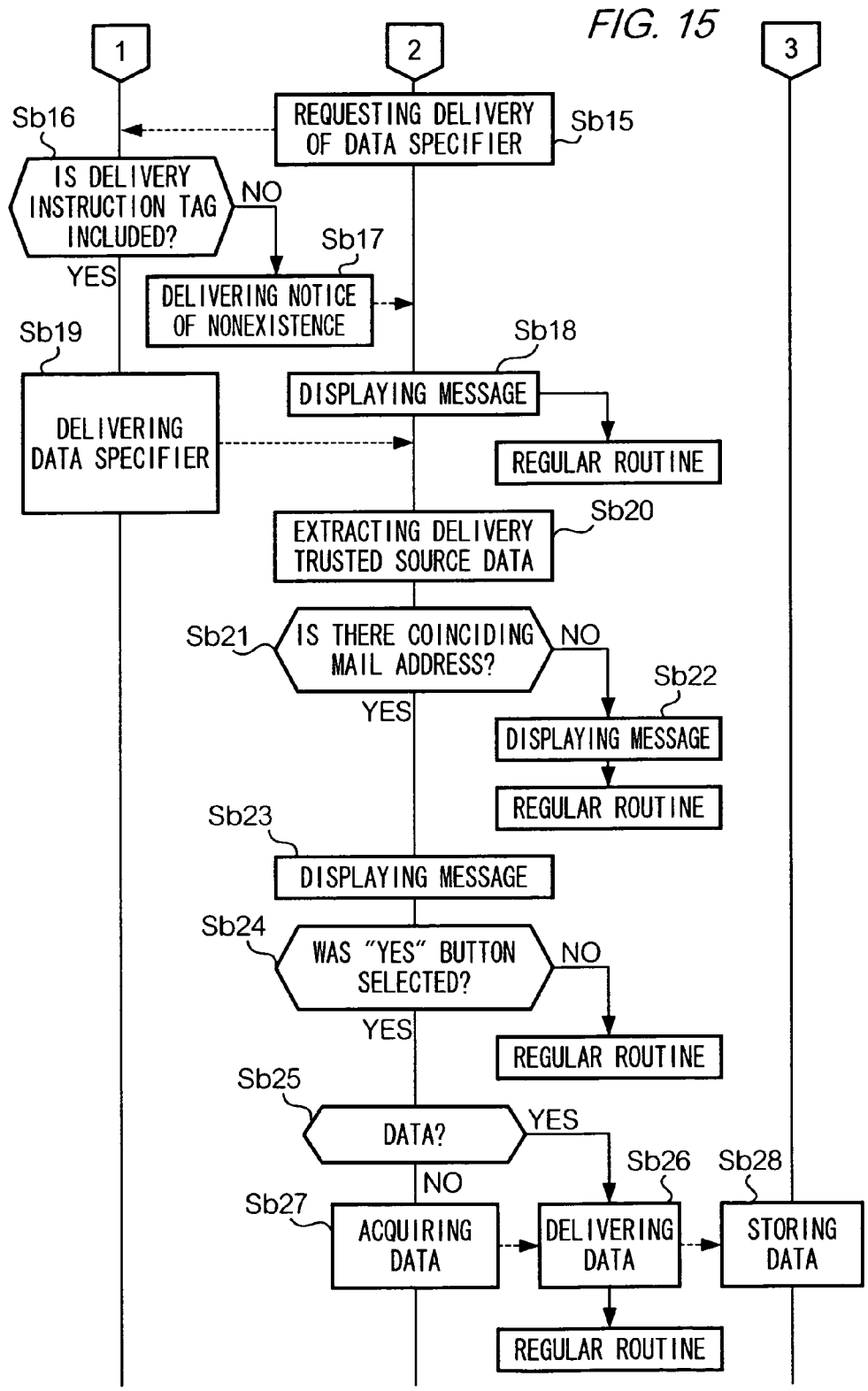

FIG. 16

```
<HTML>
<HEAD>
<TITLE>PROVISION OF DATA FOR APPLICATION</TITLE>
<META name="$$" content="$$">
</HEAD>
<BODY>
<CENTER>
<FONT size="-1"><BR>
SELECT BUTTON CORRESPONDING TO Java APPLICATION
YOU DOWNLOADED FOR GETTING DATA TO BE USED FOR
THAT Java APPLICATION.</FONT><BR>
</CENTER>
<BR>
<IMPORT"http://www.??.co.jp/$$a#xx#">
<IMG SRC="http://www.??.co.jp/.gif$$>
</IMPORT> <BR>
<IMPORT"http://www.??.co.jp/%%a#xx#">
<IMG SRC="http://www.??.co.jp/.gif$$>
</IMPORT> <BR>
<IMPORT"http://www.??.co.jp/??a#xx#"> <IMG
SRC="http://www.??.co.jp/.gif??2>
</IMPORT> <BR>
</BODY>
</HTML>
```

FIG. 17

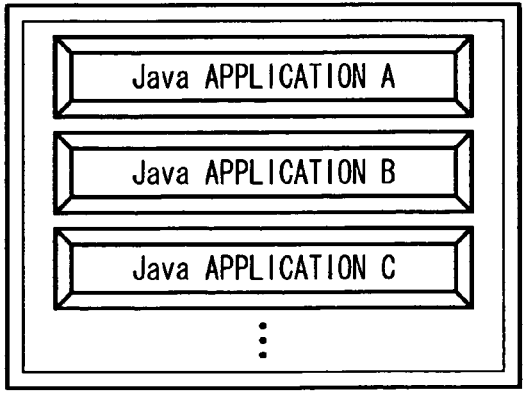

APPLICATION DATA USAGE MANAGEMENT SYSTEM FOR AN ELECTRONIC DEVICE

TECHNICAL FIELD

This invention concerns electronic devices that manage application programs and data for application programs.

BACKGROUND ART

Traditionally, electronic devices like personal computers (PCs) and mobile phones, provide various functions such as functions of word processors, spreadsheets by executing operations in accordance with installed application programs (henceforth, "applications"). In products with these sorts of applications, it is possible to handle data generated in operations in accordance with one application in operations in accordance with another application. For example, for many PCs the document data made with some applications can be edited using other applications.

In recent years, accompanying the growth of networks like the Internet, many products with electronic devices can receive (henceforth "download") a variety of useful application data from other electronic devices through networks. Moreover, products with electronic devices can also download entire applications through networks from other electronic devices.

DISCLOSURE OF THE INVENTION

With networks like the Internet, because they are open networks on which everyone has the capability to send and receive data, security isn't assured for downloaded data and applications.

Accordingly, it is undesirable from a data security point of view to permit an electronic device to handle downloaded data through an open network without any restriction. As well, it is also undesirable from a security point of view to permit an electronic device to handle data of other applications in accordance with a downloaded application without any control. By the same token, it is also undesirable from a data security point of view to permit an electric device to handle data of a downloaded application in operations in accordance with other applications without any restriction.

This invention, in view of the above problems, provides, with the aim of assuring security of information in using data and applications in an electronic device, the electronic device, management methods, programs and storage media described below.

A 1st form of the present invention is an electronic device comprising: storing means that stores (a) a plurality of applications including at least a first application and a second application, (b) source data that indicates sources of the plurality of applications respectively and (c) related data that has been related to the plurality of applications respectively; determining means that determines, based on at least one of source data of the first application or source data of the second application, whether it is permissible to use related data that has been related to the first application in operations executed in accordance with the second application; and executing means that, in the case where it has been determined by the determining means that it is permissible to use the related data, executes operations using the related data in accordance with the second application.

A 2nd form of the present invention is an electronic device according to the 1st form wherein: the storing means stores trusted source data that includes at least one set of source data that indicates a trusted source of applications; and the determining means conducts the determination based on source data of the first application and on the trusted source data.

A 3rd form of the present invention is an electronic device according to the 2nd form wherein: the storing means stores the trusted source data and the second application in an integrated form.

A 4th form of the present invention is an electronic device according to the 1st form wherein: the storing means stores trusted source data that includes at least one set of source data that indicates a trusted source of applications; and the determining means conducts the determination based on source data of the second application and on the trusted source data.

A 5th form of the present invention is an electronic device according to the 4th form wherein: the storing means stores the trusted source data and the first application in an integrated form.

A 6th form of the present invention is an electronic device according to the 2nd or the 4th form wherein: the storing means records a flag that distinguishes a part of source data that is included by the trusted source data from other parts of source data that is included by the trusted source data; and the determining means conducts the determination based on the flag.

A 7th form of the present invention is an electronic device according to the 1st form wherein: the storing means stores untrusted source data that includes at least one set of source data that indicates an untrusted source of applications; and the determining means conducts the determination based on source data of the first application and on the untrusted source data.

An 8th form of the present invention is an electronic device according to the 7th form wherein: the storing means stores the untrusted source data and the second application in an integrated form.

A 9th form of the present invention is an electronic device according to the 1st form wherein: the storing means stores untrusted source data that includes at least one set of source data that indicates an untrusted source of applications; and the determining means conducts the determination based on source data of the second application and the untrusted source data.

A 10th form of the present invention is an electronic device according to the 9th form wherein: the storing means stores the untrusted source data and the first application in an integrated form.

A 11th form of the present invention is an electronic device according to the 1st, 2nd, 4th, 7th or 9th form, further comprising: receiving means that receives at least one of the plurality of applications, source data indicating sources of the plurality of applications respectively, and related data related to the plurality of applications respectively, from an external communications device through a communications network.

A 12th form of the present invention is an electronic device according to the 11th form, wherein the receiving means receives related data related to the first application following instructions of the executing means in accordance with the first application.

A 13th form of the present invention is an electronic device according to the 11th form, wherein the receiving means receives an application and transmission origin address data that indicates a location of a transmission origin of the application; and the storing means stores at least a part of the transmission origin address data as source data of the application.

A 14th form of the present invention is an electronic device according to the 1st, 2nd, 4th, 7th, 9th or 11th form, wherein the determining means, in the case where related data that has been related to the first application includes a startup instruction that instructs a startup of the second application, determines whether it is permissible to perform the startup based on source data that indicates source of the first application; and the executing means, in the case where it has been determined by the determining means that it is permissible to perform the startup, starts the second application.

A 15th form of the present invention is an electronic device according to the 1st, 2nd, 4th, 7th, 9th or 11th form, wherein the storing means stores source data that respectively indicates sources of related data that has been related to the plurality of applications respectively; the determining means, in the case where related data that has been related to the first application includes a startup instruction that instructs a startup of the second application, determines whether it is permissible to perform the startup based on source data that indicates source of the related data; and the executing means, in the case where it has been determined by the determining means that it is permissible to perform the startup, starts the second application.

A 16th form of the present invention is an electronic device comprising: storing means that store (a) a plurality of applications including at least a first application and a second application, (b) related data that has been related to the plurality of applications respectively and (c) source data that indicates sources of the related data respectively; determining means that determines, based on source data of the related data, whether it is permissible to use related data that has been related to the first application in operations executed in accordance with the second application; and executing means that, in the case where it has been determined by the determining means that it is permissible to use the related data, executes operations using the related data in accordance with the second application.

A 17th form of the present invention is an electronic device according to the 16th form, wherein the storing means stores trusted source data that includes at least one set of source data that indicates a trusted source of related data; and the determining means conduct the determination based on source data of the first application and on the trusted source data.

An 18th form of the present invention is an electronic device according to the 17th form, wherein the storing means stores the trusted source data and the second application in an integrated form.

A 19th form of the present invention is an electronic device according to the 17th form, wherein the storing means records a flag that distinguishes a part of source data that is included by the trusted source data from other parts of source data that is included by the trusted source data; and the determining means conducts the determination based on the flag.

A 20th form of the present invention is an electronic device according to the 16th form, wherein the storing means stores untrusted source data that includes at least one set of source data that indicates an untrusted source of related data; and the determining means conducts the determination based on source data of related data related to the first application and on the untrusted source data.

A 21st form of the present invention is an electronic device according to the 20th form, wherein the storing means stores the untrusted source data and the second application in an integrated form.

A 22nd form of the present invention is an electronic device according to the 16th, 17th or 20th form, further comprising receiving means that receives at least one of the plurality of applications, related data related to the plurality of applications respectively, and source data indicating sources of the related data respectively, from an external communications device through a communications network.

A 23rd form of the present invention is an electronic device according to the 22nd form, wherein the receiving means receives related data related to the first application following instructions of the executing means in accordance with the first application.

A 24th form of the present invention is an electronic device according to the 23rd form, wherein the receiving means receives an e-mail as related data that has been related to the first application.

A 25th form of the present invention is an electronic device according to the 23rd form, wherein the receiving means receives related data related to the first application and transmission origin address data that indicates a location of a transmission origin of the related data; and the storing means stores at least a part of the transmission origin address data as source data of the related data.

A 26th form of the present invention is an electronic device according to the 25th form, wherein the receiving means receives an e-mail as related data that has been related to the first application; and the storing means stores at least a part of a mail address that indicates a location of a transmission origin of the e-mail as source data of the related data.

A 27th form of the present invention is an electronic device according to the 16th, 17th, 20th or 22nd form, wherein the determining means, in the case where related data that has been related to the first application includes a startup instruction that instructs a startup of the second application, determines whether it is permissible to perform the startup based on source data that indicates source of the related data; and the executing means, in the case where it has been determined by the determining means that it is permissible to perform the startup, starts the second application.

A 28th form of the present invention is an electronic device according to the 16th, 17th, 20th or 22nd form, wherein the storing means stores source data that indicates sources of the plurality of applications respectively; the determining means, in the case where data that has been related to the first application includes a startup instruction that instructs a startup of the second application, determines whether it is permissible to perform the startup based on source data that indicates source of the first application; and the executing means, in the case where it has been determined by the determining means that it is permissible to perform the startup, starts the second application.

A 29th form of the present invention is an electronic device according to the 11th, 12th or 22nd form, wherein the receiving means receives data size data that indicates a data size of the related data before receiving the related data.

A 30th form of the present invention is an electronic device according to the 11th, 12th, 22nd or 23rd form, wherein the receiving means receives related data that includes body data address data indicating a storage location of body data that is data to be used directly by the executing means in operations executed in accordance with the second application; the receiving means receives body data from a location indicated by the body data address data; and the executing means executes operations using the body data in accordance with the second application.

A 31st form of the present invention is an electronic device according to the 30th or 32nd form, wherein the receiving means receives data size data that indicates a data size of the body data before receiving the body data.

A 32nd form of the present invention is an electronic device according to the 11th, 12th, 22nd or 23rd form, wherein the receiving means receives related data that includes either body data that is data to be used directly by the executing means in operations executed in accordance with the second application, and body data address data that indicates a storage location of the body data; the receiving means, when the receiving means receives related data including body data address data, further receives body data from a location indicated by the body data address data; and the executing means uses, in the case where the receiving means received related data including body data, the body data included in the related data, and uses, in the case where the receiving means received related data including body data address data, body data received by the receiving means from a location indicated by the body data address data, in operations executed in accordance with the second application.

A 33rd form of the present invention is an electronic device according to the 1st, 2nd, 4th, 7th, 9th, 11th, 14th, 15th, 16th, 17th, 20th, 22nd, 27th or 28th form, wherein the executing means creates, in operations executed in accordance with the first application, related data that is related to the first application.

A 34th form of the present invention is an electronic device according to the 1st, 2nd, 4th, 7th, 9th, 11th, 14th, 15th, 16th, 17th, 20th, 22nd, 27th or 28th form further comprising: acquiring means that acquires, before the executing means executes operations using related data related to the first application in accordance with the second application, permission-prohibition data indicating whether it is permissible for the executing means to executes the operations, wherein the executing means executes, in the case where permission-prohibition data acquired by the acquiring means indicates that it is permissible for the operations to be executed, the operations.

A 35th form of the present invention is an electronic device according to the 11th, 12th, 13th, 22nd, 23rd, 24th, 25th or 26th form, wherein the receiving means receives, following an instruction of the executing means, indication data that indicates one of the plurality of applications; the executing means executes, in the case where the receiving means received, following an instruction of the executing means in accordance with the first application, indication data that indicates the second application, executes operations using related data related to the first application in accordance with the second application.

A 36th form of the present invention is an electronic device according to the 11th, 12th, 13th, 22nd, 23rd, 24th, 25th or 26th form, wherein the receiving means receives packet data wirelessly through a mobile packet communications network.

Moreover, the present invention provides data management methods that include, in electronic device, operation steps which are executed by the above memory means, decision means, receiving means, acquisition means and execution means.

Moreover, the present invention provides a program that performs instructions of operations which are executed, in the electronic device, by the above memory means, decision means, receiving means, acquisition means and execution means using a computer. Moreover, the present invention provides a storage medium that stores the above program.

When an electronic device, a management method, a program or a storage medium according to the present invention is used, it is determined whether it is permissible for data acquired or created in operations of a first application to be used in operations of a second application based on data that indicates source of the data, first application's source or second application's source; and the data is used only in the case where it has been determined to be permissible.

Accordingly, an electronic device according to the present invention can acquire data to be safely used in operations in accordance with an application stored in the electronic device based on information indicating data included in, for example, e-mail and HTML data and the like acquired from external telecommunications equipment through a network. As well, an electronic device according to the present invention can, with multiple applications stored in the electronic device, perform delivery of data.

At that time, the electronic device, based on data that indicates the source of the data that is being delivered, data that indicates the source of the application that delivers the data, or data that indicates the source of the application to which the data is delivered, determines whether it is permissible to perform delivery of data. As a result, the delivery of data that has been acquired from an untrusted source, and delivery of data by applications that have been acquired from an untrusted source, are prevented. Accordingly, the information security of the electronic device is assured.

Moreover, the electronic device can start an application to which data is to be delivered based on e-mail, HTML data or data that has been created or acquired by an application, prior to executing the delivery of the data to the application. Accordingly, the user can skip an operation for selecting and starting an application to which the data is to be delivered, Also at that time, because the electronic device judges whether it is permissible to start the application based on the source of the data or the application, information security in the electronic device is assured.

BRIEF DESCRIPTION OF THE DRAWINGS

FIG. 3 is a diagram showing contents of an e-mail created by an IP server for the first preferred embodiment of the present invention.

FIG. 8 is a diagram showing contents stored in an application management table for the first preferred embodiment of the present invention.

FIG. 15 is a diagram showing operations performed by mobile device's CPU for the first preferred embodiment of the present invention.

FIG. 16 is a diagram showing contents of HTML data corresponding to a data supplier page stored in an IP server for a second preferred embodiment of the present invention.

FIG. 17 is a diagram showing a screen shown in mobile device's display for the second preferred embodiment of the present invention.

PREFERRED EMBODIMENTS

Below, by reference to the diagrams, embodiments of this invention are described. Moreover, the embodiments blow are for purposes of illustrating the invention, and the invention is not restricted to these. The invention can take on various other forms within the scope of its technical thoughts.

1: First Preferred Embodiment 1.1: Composition

[1.1.1: Composition of the System]

Figure 1:
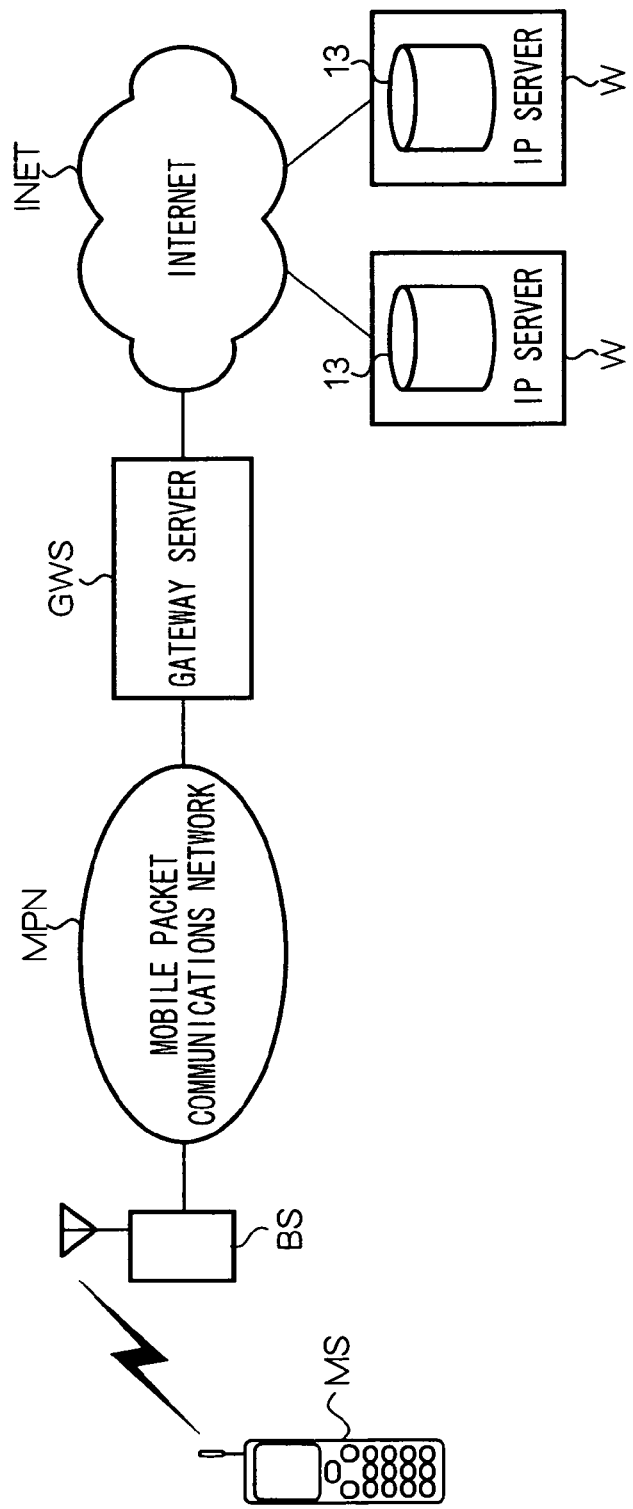
FIG. 1 is a block diagram showing a composition of a communication system for a first preferred embodiment of the present invention.

FIG. 1 is a block diagram that shows the composition of the communication system according to a first preferred embodiment of the present invention. The communication system for this preferred embodiment contains multiple mobile devices MS, multiple base stations BS, a mobile packet communications network MPN, a gateway server GWS, an internet INET, and multiple information provider (IP) servers W. FIG. 1, for the sake of simplicity of the figure, shows one mobile device MS, one base station BS and two IP servers W; however, all of these numbers are variable.

The mobile device MS is capable of the sending and receiving of various data between IP servers W, sequentially through a base station BS, the mobile packet communications network MPN, the gateway server GWS and the internet INET.

The IP server W contains a World Wide Web (WWW) server program and when it receives from mobile device MS a Hypertext Transfer Protocol (HTTP) message formatted as a GET method—a method that performs data's send request (hereinafter "GET request"), it can transmit to mobile device MS the data that has been requested by the GET request received in accordance with the WWW server program.

In the data held by IP server W there can be, for example, data in Hypertext Markup Language (HTML) format corresponding to various web pages (hereinafter "HTML data") and Java applications in the Java (registered trademark) programming language. As well, the Java application held by IP server W is divided into a JAR file that includes the body of the Java application and substantive data related to the Java application, and an Application Descriptor File (ADF) which is a text file including a name of the application and a Uniform Resource Identifier (URI) that indicates the storage location of the JAR file, and is stored in an application database 13 (hereinafter "database" is abbreviated as "DB").

Hereinafter, with this specification, as long as there is no need to especially distinguish the ADF and the JAR file, these will be mentioned together simply as "Java application". Moreover, in this embodiment, the Java application's ADF and JAR file are assumed to be stored together in IP server W; however, the ADF and the JAR file of the Java application may be stored separately in various distinct servers.

Figure 2:
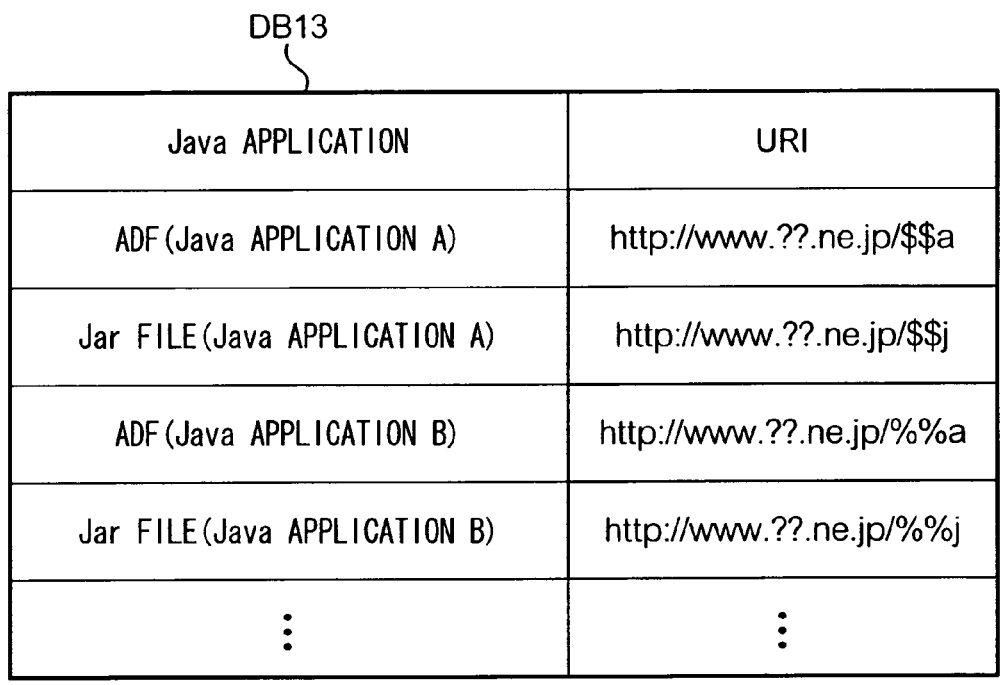
FIG. 2 is a diagram showing contents stored in an application DB for the first preferred embodiment of the present invention.

FIG. 2 is a figure that illustrates the contents of the data stored in application DB 13. As shown in the same figure, in application DB 13 according to the present invention, Java application's ADFs and JAR files held in IP server W are stored along with URIs each of which indicates a storage location of the file.

As well, the IP server W has a function that provides mobile device MS various data that are used by the mobile device MS when it performs operations in accordance with a Java application downloaded from IP server W. In this embodiment, the IP server W contains a mailer, i.e., an application that performs the sending and receiving of e-mail; the IP server W creates e-mail that includes data that must be provided to the mobile device MS, and by transmitting the e-mail to the mobile device MS in accordance with the mailer, it provides the data to mobile device MS.

FIG. 3 is a figure that illustrates the contents of e-mail created by an IP server W. In particular, in FIG. 3, there is an instance of e-mail formatted according to the Multipurpose Internet Message Extension standard (MIME—see RFC2045/2046, etc.); however, if there are formats that can possibly include various data in e-mail, those other e-mail formats may also be used. As well, in FIG. 3, the header in e-mail with "From:??<@??.nejp>" created by IP server W is a header that includes the transmission origin address of the e-mail.

As well, in this e-mail, there is mentioned a character string "<MOVE><param>"http://www.??.cojp/$$a"</param></move>". In this character string, the "<MOVE>" and "</MOVE>" construction is made up of tags that specify a Java application startup for mobile device MS (hereinafter "startup instruction tags") and, between these, the "<param>" and "</param>" construction (hereinafter "parameter tags"), which holds "http://www.??.co.jp/$$a" as its argument, is made up as an argument (See RFC1896). Here, the "http://www.??.co.jp/$$a" is information to specify the Java application that must be started (hereinafter "application specifier") in mobile device MS, and, in this embodiment the application specifier is assume to be a URI that indicates the download origin of the Java application's ADF.

Moreover, apart from the URI that shows the download origin of the ADF, any uniquely specifying information for the given Java application, e.g., the URI that indicates the JAR file download origin, may be used as its application specifier.

As well, in the instance of FIG. 3, the following character string is shown: <IMPORT><param>"??"</param></IMPORT>. The "<IMPORT>" and "</IMPORT>" constructions are tags for providing data (hereinafter "delivery instruction tags") to mobile device MS, and between these parameter tags, the "??" is assumed to be the argument. The "??" part is, hereinafter, called the "data specifier."

Some data specifiers begin with "DATA", and others begin with "ACQUISITION". The data specifier that begins with "DATA" contains substantive data that must be supplied to the mobile device MS. For example, where "DATA/12345/" data specifier is included between parameter tags within delivery tags, "12345" is the data to be directly used for operations on mobile device MS.

The data specifier that begins with "ACQUISITION" contains, after "ACQUISITION", information to specify the substantive data that must be provided to mobile device MS. In this embodiment, as information specifying the substantive data, the URI that indicates the storage location of that data is being used. For example, in the case where there is a data specifier that has "ACQUISITION\http://#WWW.??.co.jp/??\" between parameter tags that are between delivery tags, the data specifier "http://WWW.??.cojp/??", is not data that is directly used in operations on mobile device MS, but is rather a URI that indicates the download origin of that data; the mobile device MS uses this URI to download the substantive data.

The IP server W uses the mentioned data specifier and can provide any kind of data to mobile device MS. For example, in the case where a Java application for mobile device MS to implement a game has been downloaded from IP server W to mobile device MS, IP server W can provide to mobile device MS parameters which are used for changing settings for the game.

Moreover, in the case where IP server W creates e-mail that includes a data specifier, either of a data specifier that begins with "ACQUISITION" or a data specifier that begins with "DATA" may be used, so long as the choice is standardized. As an example of such a standardization: where the data quantity of the substantive data that must be provided to mobile device MS exceeds a prescribed threshold, use a data specifier that begins with "ACQUISITION"; in the case where it does not exceed that threshold, use a data specifier that begins with "DATA". With such a standardization, problems where the user unexpectedly receives oversized e-mail can be avoided since transmission of an oversized mail to mobile device MS is prevented.

As well, the data specifier that begins with "DATA" can include any existing type of data so long as the data is text data, or binary data that has been converted to text data. For example, in the case where a data specifier includes HTML data, the HTML data can include startup instruction tags and the delivery instruction tags as well; it can include between these tags both application specifiers and data specifiers.

The mobile packet communications network MPN shown in FIG. 1 is a communications network for providing packet communications services for mobile devices MS. The mobile packet communications network NPN connects multiple base stations BS by wired communications, and base stations BS are capable of connection with mobile devices MS by wireless communications. The mobile packet communications network MPN is connected to the gateway server GWS. As well, the mobile packet communications network MPN includes packet service user management unit (not shown).

The gateway server GWS is a server apparatus established in a mobile packet gateway trunk exchange station that interconnects internet NET with mobile packet communications network MPN. After the gateway server GWS has rewritten the format of data received from internet INET into a format conforming to the protocol for data communications with the mobile packet communications network MPN, the GWS server transmits that data to mobile packet communications network MPN. Similarly, after the gateway server GWS has rewritten the format of data received from mobile packet communications network MPN to a format conforming to the protocol for data communication for internet INET, the server GWS transmits that data to internet INET.

In addition to the above functions, the gateway server GWS for this embodiment also contains a mail server function. The gateway server GWS receives e-mail addressed to mobile device MS, stores that received mail, and transmits that e-mail to the addressed mobile device MS (so-called "push" distribution.) When the transmission of e-mail is not successful, the gateway server GWS manages distribution of that e-mail to mobile device MS by, for example, retransmitting that e-mail for mobile device MS, after a set interval. Similarly, in the case where the gateway server GWS received, from the mobile device MS, e-mail addressed to IP server W, it transmits that e-mail to the addressed IP server W.

The mobile device MS is a portable electronic device such as a mobile phone device and is able to perform data communications between IP server W through base stations BS, a mobile packet communications network MPN, the gateway server GWS and the internet INET. Moreover, the mobile device MS is able to perform voice communications between landline telephones and the like (not shown), through base stations BS and the mobile phone network and other networks (not shown).

The mobile device MS has a WWW browser for composing web pages based on HTML data and the like, and displaying the web pages composed. When mobile device MS receives HTML data from IP server W, for example, it displays a web page based on the HTML data received in accordance with the WWW browser.

Moreover, the mobile device MS has a mailer and it can perform the sending and receiving of e-mail in accordance with the mailer. In e-mail that mobile device MS receives, as mentioned above, there is a case where a startup instruction tag is included. In that case the mobile device MS, based on the application specifier included between the startup instruction tags, starts the Java application indicated. With that result, the mobile device MS, based on the result of an operation for receiving e-mail in accordance with the mailer, can start a Java application other than the mailer. This operation is hereinafter called a "startup operation", the details of which are discussed below.

As well, in e-mail that mobile device MS receives, there is, as mentioned above, a case where, in addition to the startup instruction, delivery instruction tags are included. In the case where a data specifier that begins with "DATA" between delivery instruction tags has been included in e-mail, the mobile device MS uses substantive data that has been included after "DATA" in operations executed in accordance with a Java application started by the startup function mentioned. As well, in the case where, between delivery instruction tags included in e-mail, a data specifier that begins with "ACQUISITION" appears, the mobile device MS downloads the substantive data based on a URI included after "ACQUISITION" and uses the downloaded substantive data in operations executed in accordance with a Java application started by the startup function. As a result, the mobile device MS can use data acquired in operations in accordance with the mailer for operations to be executed in accordance with a Java application other than the mailer. This operation is hereinafter referred to as a "data delivery operation", the details of which are discussed below.

When mobile device MS is permitted to execute startup operation or data delivery operation mentioned without any restriction, there is a case that produces information security problems. One example is where mobile device MS starts a Java application stored in mobile device MS in which that startup is based on an application specifier included in e-mail transmitted from IP server W by a malicious third party; moreover, based on a data specifier included in the same e-mail, this startup operation can presumably change the settings of the Java application started. In that case, there is the risk that mobile device MS transmits data which is not intended by the user to IP server W or the like in operations in accordance with that Java application.

In this embodiment, for avoiding the above sorts of problems, each ADF of Java application includes a startup trusted source data and a delivery trusted source data and the mobile device MS, based on these data, determines whether executing startup operations and data delivery operations according to the content of e-mail received is permissible.

The startup trusted source data includes at least one trusted transmission origin address for e-mail that concerns startup operations. The manager or the like of an IP server W, that is the supplier origin of the Java application, registered to that Java application's ADF as a startup trusted source data, e-mail transmission origin addresses that are considered to be reliable enough for that Java application to be started by an application specifier included in e-mail from the e-mail transmission origin addresses. The mobile device MS, in the case where startup instruction tags in e-mail received have been included, first extracts the startup trusted source data from the ADF of the Java application designated by the application specifier included between the startup instruction tags. Then, the mobile device MS determines whether the transmission origin address of the e-mail received is included in the startup trusted source data extracted. The mobile device MS starts that Java application only in the case where, in the startup trusted source data, the transmission origin address of the e-mail received has been included.

The delivery trusted source data includes at least one trusted transmission origin address for e-mail concerning data delivery operations. The manager or the like of an IP server W, that is the supplier origin of the Java application, registered to that Java application's ADF as a delivery trusted source data, e-mail transmission origin addresses that are considered to be sufficiently reliable for that Java application to use data acquired by a data specifier included in e-mail from the e-mail transmission origin addresses. The mobile device MS, in the case where delivery instruction tags are included in e-mail received, extracts the delivery trusted source data from the ADF of the Java application designated by the application specifier included between the startup instruction tags included in that e-mail. Then, mobile device MS determines whether the transmission origin address of the received e-mail is included in the delivery trusted source data extracted. The mobile device MS, only in the case where, in the delivery trusted source data, the transmission origin address of the e-mail received has been included, uses data designated by the data specifier included between delivery instruction tags for operations executed in accordance with that Java application.

[1.1.2: IP Server Composition]

Figure 4:
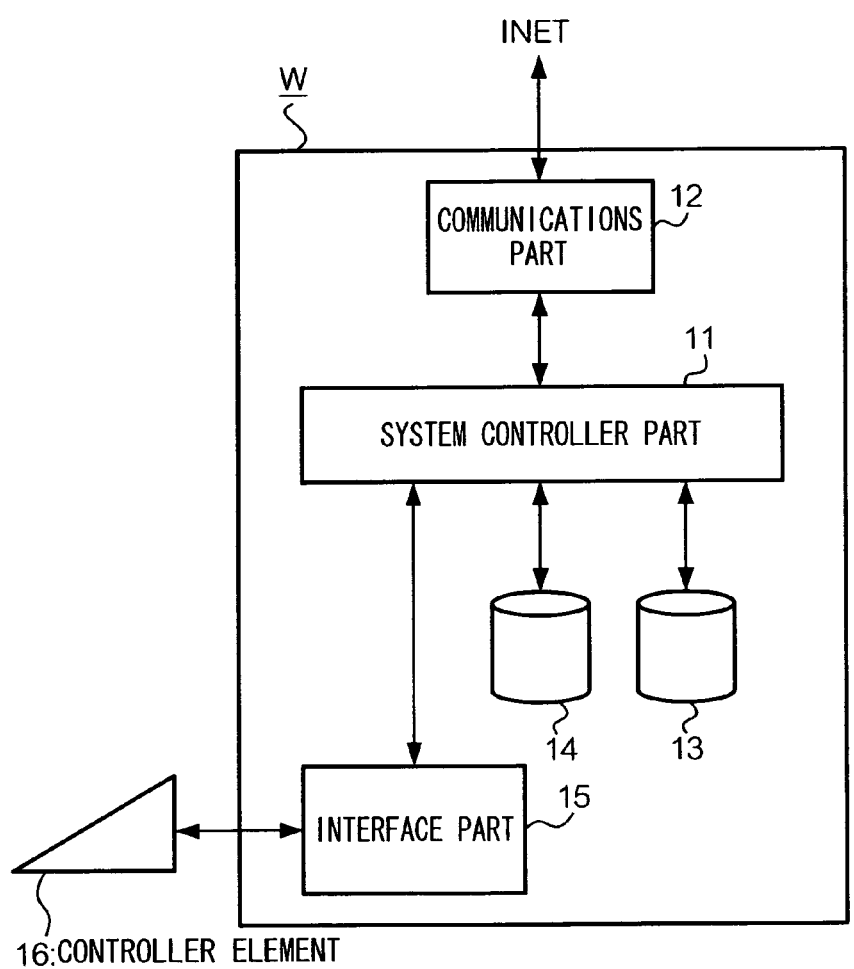
FIG. 4 is a block diagram showing a composition of an IP server for the first preferred embodiment of the present invention.

FIG. 4 is a figure that shows the composition of the IP server W according to this embodiment. The IP server W, as depicted in FIG. 4 contains a system controller part 11, a communications part 12, the aforementioned application DB 13, a user management DB 14, an interface part 15 (hereinafter "interface" is abbreviated as "I/F"), and a controller element 16.

The communications part 12, relays transfer of data to and from system controller part 11 and internet INET, and passes data received from external electronic devices through internet INET to system controller part 11, and transmits data accepted from system controller part 11 to external electronic devices through internet INET.

The system controller part 11 contains a Central Processing Unit (CPU), a Read Only Memory (ROM), a Random Access Memory (RAM), nonvolatile memory, etc., and it controls each component of IP server W. The ROM contains a variety of control information and control programs to control each component of IP server W. The nonvolatile memory stores HTML data for composing various web pages, etc., and also stores the WWW server program and mailer mentioned. The CPU performs operations executed in accordance with various programs stored in ROM and nonvolatile memory. The RAM is being used as a work area that stores data temporarily for the operations of the CPU.

Figures 5, 6:
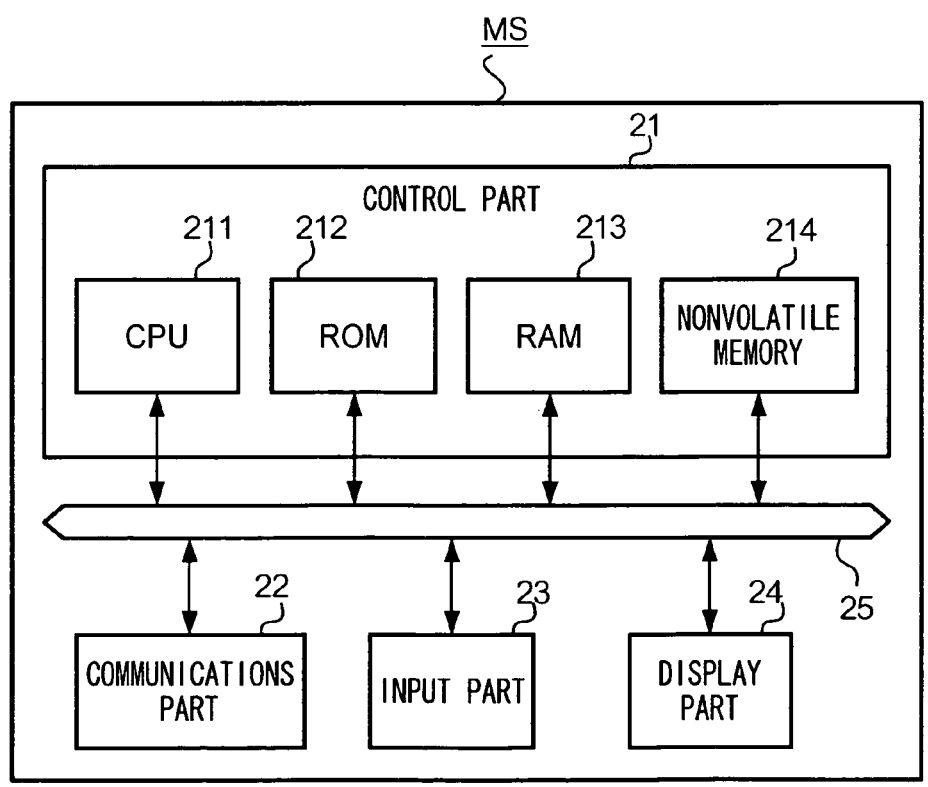
FIG. 5 is a diagram showing contents stored in a user management DB for the first preferred embodiment of the present invention.
FIG. 6 is a block diagram showing a composition of a mobile device for the first preferred embodiment of the present invention.

In user management DB 14, information concerning the mobile device MS that downloaded the Java application from IP server W is stored. FIG. 5 is a figure that illustrates the contents of data stored in user management DB 14. In user management DB 14, first, for each Java application stored in application DB 13, as information to specify each Java application, a URI that indicates the download origin of that Java application's ADF is stored. Moreover, in user management DB 14, the mail addresses of any number of mobile devices MS that downloaded each Java application are stored in correspondence with the URIs of those Java applications.

Interface part 15 shown in FIG. 4 relays the transfer of data between system controller part 11 and controlling element 16. The controlling element 16 is composed of keyboard, mouse, liquid-crystal display, etc., and through controlling element 16, the system controller part 11 acquires data from the user and supplies content to the user. Moreover, the controlling element 16 can be an electronic device such as a PC with input-output functions connected to IP server W.

The manager or the like of IP server W (hereinafter "operator"), by operations used in controlling element 16, performs specification of Java applications that should be started in mobile device MS, and specification of the data that should be used in operations executed in accordance with those Java applications in mobile device MS.

For example, when the operator wants to provide, for a mobile device MS that has already downloaded a Java application, data to be used for operations executed in accordance with that Java application, the operator, first, by operating the keyboard and other user interface control devices of controlling element 16, designates a URI that indicates the download origin of the Java application as the information designating that Java application. Then, the operator performs input of the data to be provided to mobile device MS.

In response to these operations of the operator, the system controller part 11 creates e-mail that includes startup instruction tags that include between them, as the application specifier, the URI that has been designated, and that includes delivery instruction tags that include between them, as data specifier, the data that has been entered (see FIG. 3). Then, the system controller part 11 read outs from user management DB 14 the mail addresses of the mobile devices MS that have been put into correspondence with the Java application specified by the designated URI. The system controller part 11 runs the mailer and addresses the e-mail created using all of the mail addresses read out and transmits the e-mail created.

[1.1.3: Composition of the Mobile Device]

FIG. 6 is a figure that shows the composition of a mobile device MS according to this embodiment. The mobile device MS contains a control part 21, a communications part 22, an input part 23, and a display part 24. Each of these components is interconnected by a data bus 25.

The communications part 22 performs radio communications with base stations BS under the control of control part 21. The display part 24 is composed of a liquid crystal panel, a driving force circuit, etc., and, the under control of control part 21, shows various information. The input part 23 has various buttons and, in response to button operations by the user, sends to control part 21 operation signals that correspond to the buttons.

The control part 21 has CPU211, ROM212, RAM213, nonvolatile memory 214, etc., and controls each component of mobile device MS.

The CPU211, by executing applications stored in ROM212 and nonvolatile memory 214, controls each component of mobile device MS. The RAM213 is used as a work area for CPU211 that temporarily stores data for operations.

The ROM212, apart from holding various control information and control programs, also holds various applications to be executed by CPU211. The applications stored in ROM212 have been preinstalled for mobile device MS and are already in ROM212. As applications stored in ROM212, in addition to the WWW browser and mailer mentioned, there is Java 2 Micro Edition (J2ME), etc., as software for creating the execution environment of a Java application. Hereinafter, in the case where there is a need to distinguish an application stored in ROM212 from a Java application that has been downloaded from IP server W, we call an application stored in ROM212 a "native application".

Figure 7:
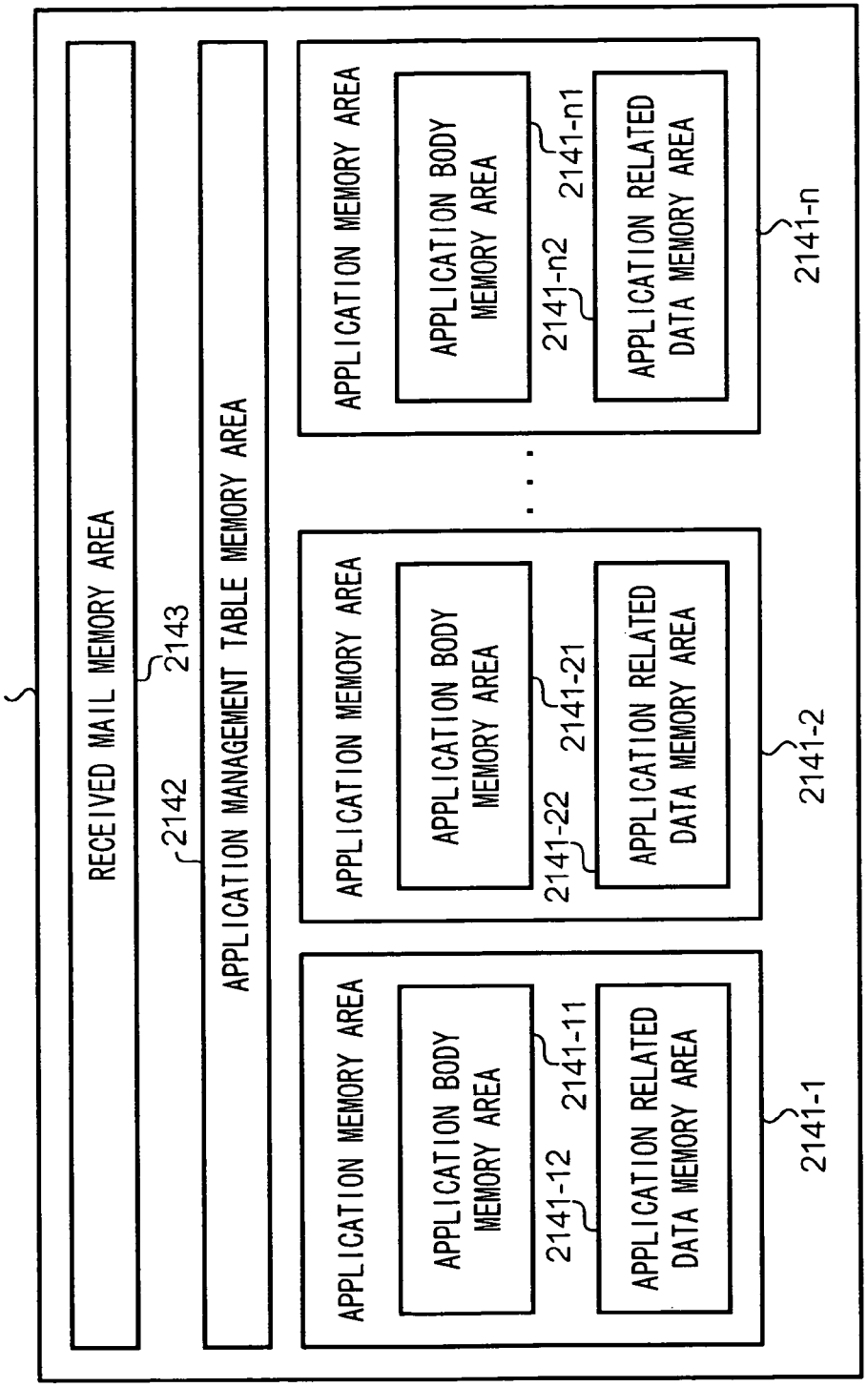
FIG. 7 is a diagram showing contents stored in mobile device's nonvolatile memory for the first preferred embodiment of the present invention.

FIG. 7 is a figure that shows the composition of data that is stored in nonvolatile memory 214. In nonvolatile memory 214, multiple application memory areas 2141-$k$ ($k$=1, 2, ..., n), an application management table memory area 2142 and a received mail memory area 2143 are established. The received mail memory area 2143 is an area for storing e-mail that mobile device MS received. The application memory area 2141-$k$ is an area for storing Java applications that mobile device MS downloaded from IP server W, and data related to those Java applications. Application memory areas 2141-$k$ subsume application body memory areas 2141-$k$1, which are established for storing the respective bodies of Java applications, and application related data memory areas 2141-$k$2, which are established for storing the various respective data that relates to Java applications.

In application body memory areas 2141-$k$1 the ADF, that form the body of a Java application, and the JAR file are stored. In application related data memory areas 2141-$k$2, there is data that was downloaded as attachment data from IP server W when the body of a Java application was downloaded; data that the user of mobile device MS entered as settings for Java applications; data acquired as data that relates to Java applications for operations that mobile device MS executed in accordance with other applications; and data created in operations that the mobile device MS executed in accordance with Java applications, and so on. For example, in the case where, in application body memory areas 2141-$k$1, an application for implements a game in mobile device MS is stored, saved data for that game that shows points the user acquired, the intermediate progress of the game, etc., can be stored in the application related data memory areas 2141-$k$2 as related data.

The CPU211 controls by running the control program so that, in operations executed in accordance with Java applications stored in application body memory areas 2141-$k$1, all related data except for related data stored in application related data memory areas 2141-$k$2 that have been included in the same application memory area 2141-$k$, cannot been directly used. For example, the CPU211, in operations executed in accordance with a Java application stored in application body memory area 2141-11, does not directly read out and use data in application related data memory area 2141-22, application related data memory area 2141-32, etc.

Application management table TBL1, which indicates the storage locations of Java applications that mobile device MS downloaded from IP server W, is held in application management table memory area 2142. FIG. 8 is a figure that illustrates the contents of application management table TBL1. In application management table TBL1, the URI that indicates the download origin of the ADF as information that specifies the Java applications that the mobile device MS downloaded from IP server W, and the memory address of application memory area 2141-$k$ that is storing Java applications, are put into correspondence and are stored.

Figure 9:
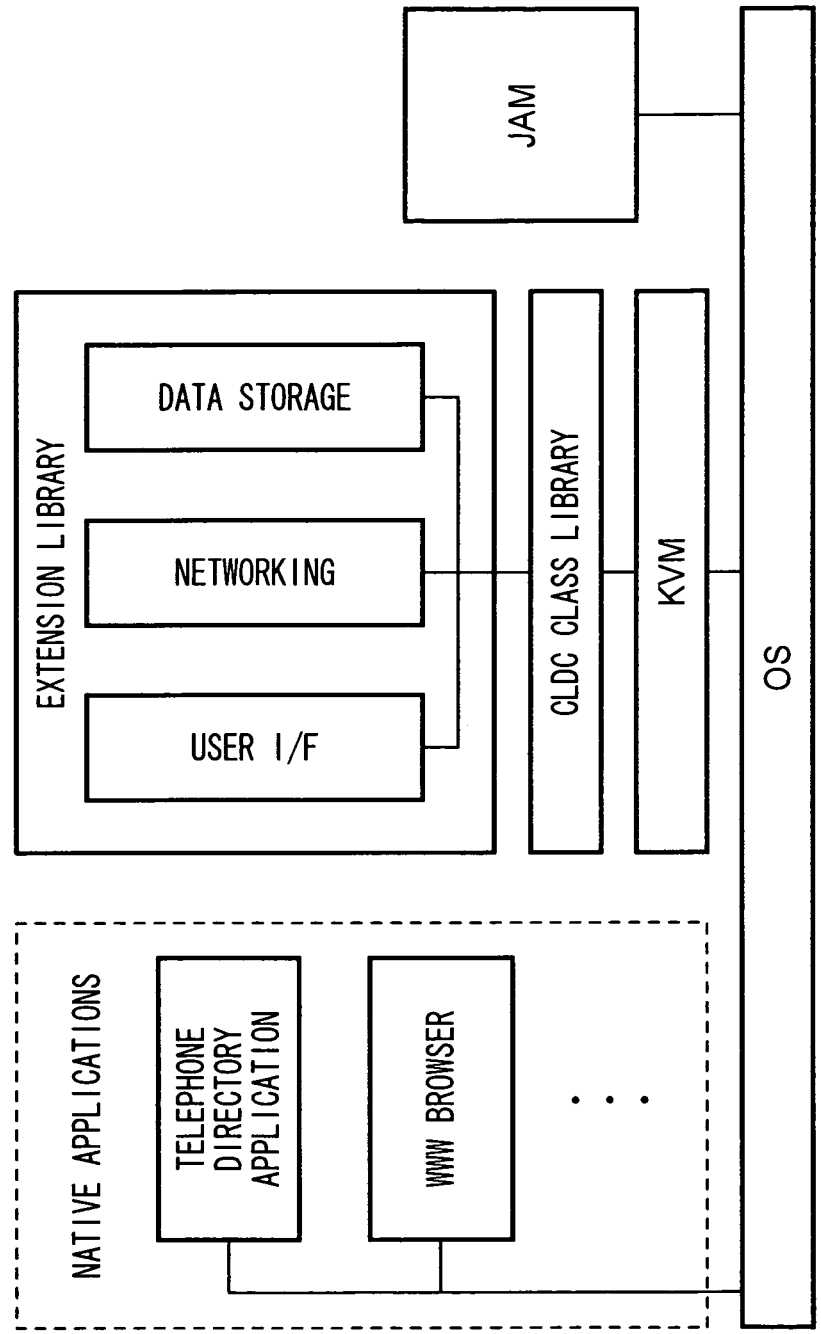
FIG. 9 is a diagram showing Java application's execution environment in a mobile device for the first preferred embodiment of the present invention.

FIG. 9 is a figure that shows the execution environment of Java applications established in mobile device MS. The execution environment of Java applications for mobile device MS includes the Operating System (OS) that controls the fundamental operations such as input-output operations for mobile device MS, and in addition, native applications that execute using functions provided by the OS, the K Virtual Machine (KVM) and Connected Limited Device Configuration (CLDC) class libraries for configuring the J2ME, the extension libraries, and the Java Application Manager (JAM).

KVM is a Java Virtual Machine (JVM) that has been designed for use in small electronic devices. KVM changes bytecodes, that are the code for the executable file format of Java applications, into executable codes, which CPU211 can interpret in accordance with the OS and execute. The CLDC class library is a library of programs with functional restrictions in hand-held telecommunications equipment in consideration of their restricted CPU throughput and memory capacity.

The extension library is a library of programs using the CLDC class library to implement various functions for mobile device MS. In the extension library, there are multiple Application Program Interfaces (APIs) in response various requirements, such as user I/F, networking, data storage, etc. For example, the API for data storage use is a program to implement reading and writing of related data for application related data memory areas 2141-$k$2.

JAM provides, using functions provided by the OS, various management functions for Java applications, such as management of the download of Java applications, management of installation and deletion of Java applications in application memory areas 2141-$k$ and the like, and management of startup and forced termination of installed Java applications.

For example, CPU211 runs JAM and compares the transmission origin mail address of the e-mail received with the startup trusted source data or delivery trusted source data included in the ADF of the Java application designated by the application specifier included in that e-mail, and determines whether to perform the operation instructed in the e-mail received.

1.2: Operations

Below, the operations of the present invention are explained. The user of mobile device MS, prior to using a Java application, must first download the application from IP server W. After that, the user, by e-mail that is sent from IP server W, can acquire data that concerns the downloaded Java application.

[1.2.1: Operations when Downloading Java Application]

Figure 10:
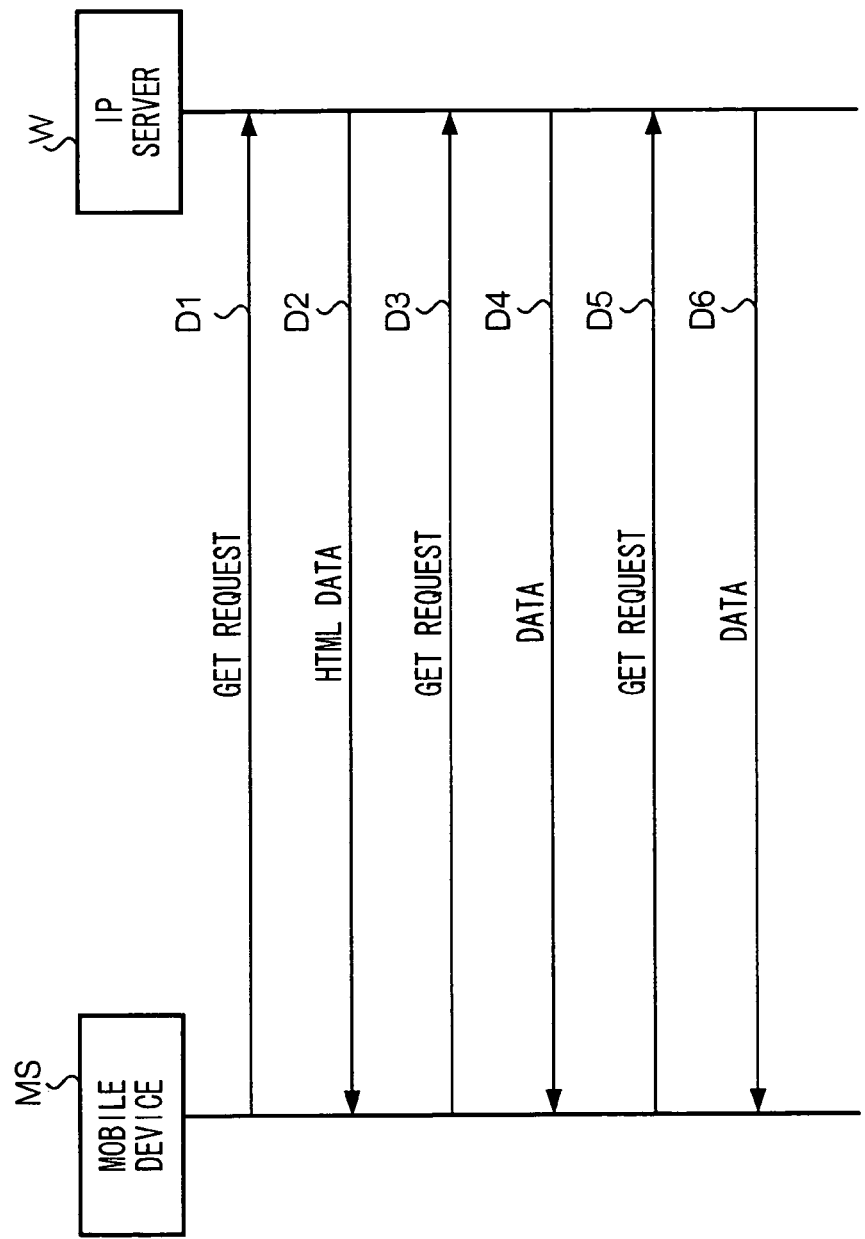
FIG. 10 is a diagram showing flows of data transfers executed in a communication system for the first preferred embodiment of the present invention.

First actions of a user of the mobile device MS when downloading Java applications for mobile device MS from IP server W are explained using the data sequence chart in FIG. 10. Moreover, in the following explanation, contents stored in application DB 13 is assumed to be as shown in FIG. 2, and the mail address of mobile device MS is assumed to be "aa@aa.ne.jp".

The user performs operations using input part 23 to specify startup of the WWW browser for mobile device MS. The CPU211 receives, from input part 23, an operation signal that indicates an instruction to start up the WWW browser and, in response to that operation signal, it reads the WWW browser from ROM212, while at the same time it performs a registration process to a packet service user management unit included in mobile packet communications network MPN for mobile device MS to perform packet communications between mobile packet communications network MPN.

Then, the user inputs to mobile device MS the URI that indicates the storage location of the web page used to download the Java application which is to be stored in IP server W (hereinafter "download page"). The CPU211, in response to input of the URI by the user, sends a GET request D1, which includes that URI and identifier of that mobile device MS, through communications part 22 to mobile packet communications network MPN. On the basis of the URI, the GET request D1 is sequentially sent to the IP server W specified by the URI through gateway server GWS, and internet INET.

When the system controller part 11 of IP server W receives GET request D1 through communications part 12, it runs the WWW server program and sends the HTML data D2 that corresponded to the URI included in GET request D1 (i.e. various data to compose the download page), along with the identifier of mobile device MS included in GET request D1, to internet INET. On the basis of the identifier of the mobile device MS, the HTML data D2 is sequentially sent to the mobile terminal MS specified by the identifier through, gateway server GWS, mobile packet communications network MPN, and base stations BS.

Figure 11:
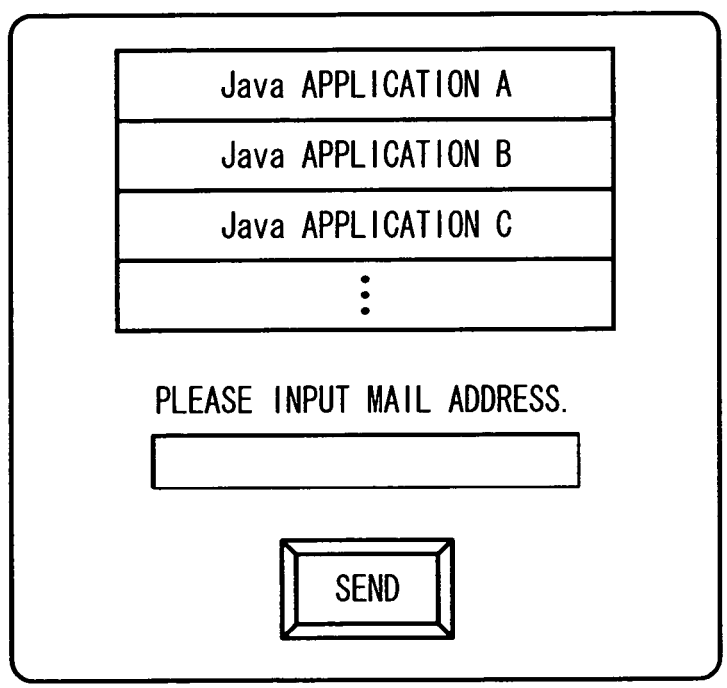
FIG. 11 is a diagram showing a screen shown in mobile device's display for the first preferred embodiment of the present invention.

The CPU211 of mobile device MS receives HTML data D2 and stores HTML data D2 in RAM213; then, after it has composed the download page based on HTML data D2, it displays the download page in display part 24. FIG. 11 is a figure that shows a download page. The download page includes downloadable Java applications from IP server W to mobile device MS (i.e., the name list of all Java applications stored in application DB13), the input field of the mail address, and a "send" button. Moreover, the names of the Java applications displayed in the download page and the URIs that indicate the download origins of the ADFs of the respective Java applications have been put into correspondence.

The user performs an operation in the download page that selects the names of the Java applications that will be downloaded, and inputs a personal mail address, "aa@aa.ne.jp", in the mail address input field and, after that, performs a choice operation of the "send" button. In response to that choice operation, the CPU211 creates the URIs of the ADFs that have been put into correspondence with the name of the Java applications the user selected, the mail address "aa@aa.ne.jp" the user entered, and a GET request D3 that includes the identifier of mobile device MS, and sends the GET request D3 to mobile packet communications network MPN.

GET request D3 is received by the IP server W specified by the URI. When system controller part 11 of IP server W receives GET request D3, it extracts the mail address "aa@aa.ne.jp" included in GET request D3 and stores the mail address extracted in the row of user management DB14 specified by the URIs included in GET request D3 (see FIG. 5). Then, the system controller part 11 reads out from application DB 13 the ADFs that corresponded to the URIs included in GET request D3 and sends, as data D4, to internet INET, the ADFs read out, along with the identifier of mobile device MS included in GET request D3.

Figure 12:
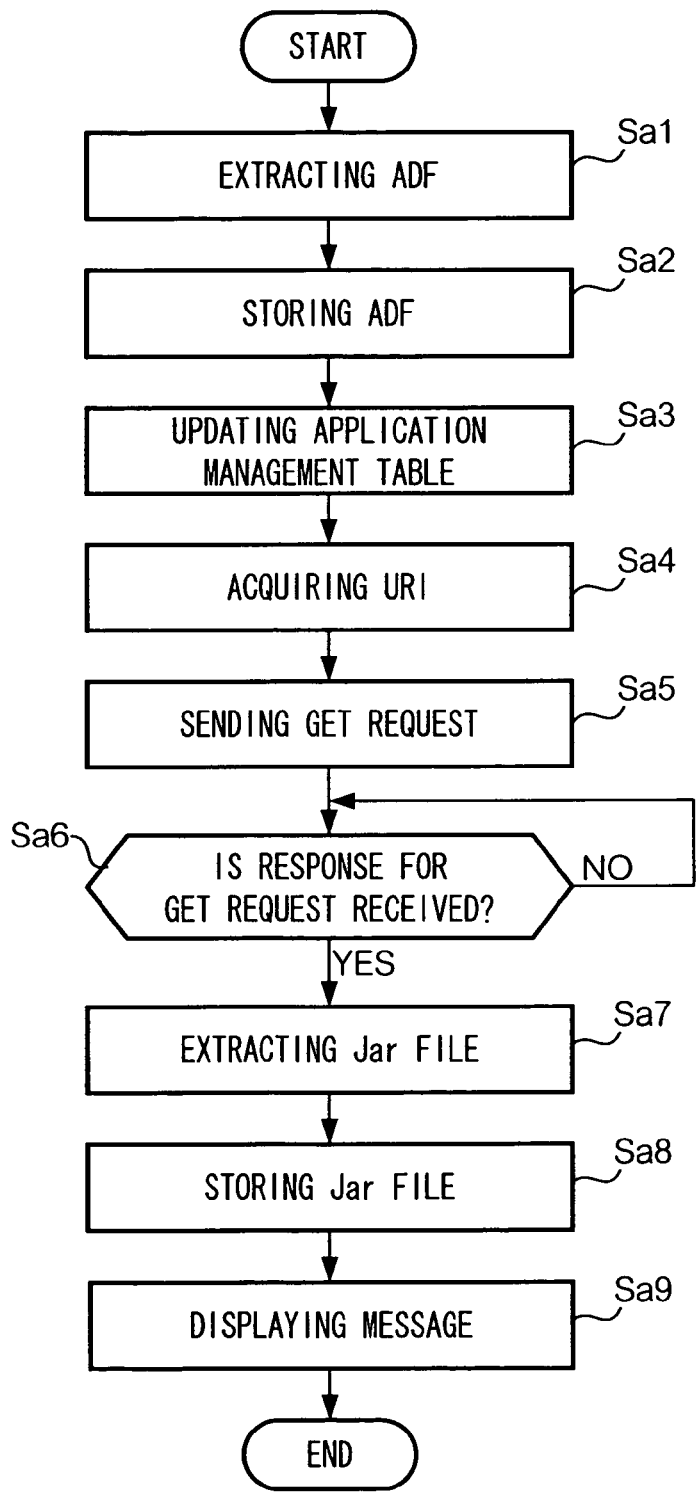
FIG. 12 is a diagram showing operations performed by mobile device's CPU for the first preferred embodiment of the present invention.

Data D4 is received by the mobile device MS that was specified by the identifier. When the CPU211 of mobile device MS receives data D4, JAM performs a download operation on the JAR files that are the substantive data of the Java application. Hereinafter we explain the process using the flow diagram that illustrates, in FIG. 12, the download operation for JAR files.

First, the CPU211 extracts the ADFs from data D4 (step Sa1) and stores the ADFs extracted in an application body memory areas 2141-$k1$ (step Sa2). Then, the CPU211 puts into correspondence the memory addresses of application body memory areas 2141-$k1$ that store the ADFs and the URIs that indicate the download origin of the ADFs; and stores them in application management table TBL1, thereby updating application management table TBL1 (step Sa3).

Then, the CPU211 acquires from the ADFs the URIs indicating the storage locations of the JAR files (step Sa4). Then, the CPU211 runs the WWW browser and sends the URIs acquired, and GET request D5 that includes the identifier of mobile device MS, to mobile packet communications network MPN (step Sa5). After transmission of GET request D5, the CPU211 is put in a state of determining whether it received a response for GET request D5 (step Sa6). That is to say, the CPU211, at short fixed intervals, for example, one second, repeats the operation that determines whether data that includes the JAR files requested using GET request D5 has been received by communications part 22.

On the other hand, based on a URI that indicates the storage location of the JAR files, the GET request D5 sent from mobile device MS is sequentially sent, and is received by IP server W. When the system controller part 11 of the IP server receives GET request D5, it reads out the JAR files that correspond to the URIs included in GET request D5 from application DB 13. The system controller part 11 sends to internet INET the JAR files that were read out, along with the identifier of mobile device MS that was included in GET request D5, as data D6.

The data D6 is received by mobile device MS specified by the identifier. When the CPU211 of mobile device MS receives data D6, it gets "Yes" as a result of the decision of step Sa6. The CPU211 then extracts the JAR files from data D6 (step Sa7). The CPU211, after the JAR files are extracted, stores them in application body memory areas 2141-$k1$ (step Sa8), displays a message like "download finished" in display part 24 (step Sa9), completing the download operation of a series of JAR files.

Done in the above way, when a Java application is downloaded to mobile device MS, the CPU211 runs JAM, executes an installation operation on the Java applications downloaded, and the CPU211 becomes capable of performing various operations executed in accordance with the Java applications.

[1.2.2: Actions when Supplying Various Data to Java Application]

For mobile device MS, the actions when it acquires data that relates to Java applications downloaded from IP server W from IP server W will be explained. In the following explanation, assume that the memory contents of application DB 13 and user management DB 14 of IP server W respectively are those of FIG. 2 and FIG. 5, and the contents of application management table TBL1 of mobile device MS as being those of FIG. 8. As well, the mail address of IP server W is assumed to be "pp@pp.ne.jp".

The operator of IP server W prepares the related data for "Java application A", including settings and the like. Then, the operator, by operating controlling element 16, displays a list of Java applications stored in application DB 13. The operator performs an operation that selects "Java application A" in that list display screen. The system controller part 11 of IP server W, in response to that operation, executes an e-mail transmission operation explained below.

First, the system controller part 11 reads out from user management DB 14 all mail addresses stored in correspondence with the URI that indicates the download origin of the ADF of "Java application A" (i.e. "aa@aa.ne.jp", "bb@bb.ne.jp", etc.), and temporarily records them in RAM.

Then, the system controller part 11 reads out from user management DB 14 the URI that indicates the download origin of the ADF of "Java application A", "http://www.??.co.jp/$$a", and temporarily records it in RAM.

Then, the system controller part 11 creates e-mail with startup instruction tags that include between them the URI "http://www.??.co.jp//$$a" stored temporarily in that RAM as application specifier; i.e., it creates e-mail with tags that include "<MOVE><param>" http://WWW.??.co.jp/$$a "</param></MOVE>".

Then, the system controller part 11 displays for the operator, in the liquid-crystal display of controlling element 16, a message that prompts specification of related data to transmit to mobile device MS. The operator, in response to that message, performs an operation that selects the previously prepared related data of "Java application A".

Then, the system controller part 11 acquires the data quantity of the related data that has been designated by the operator and, where that data quantity exceeds a threshold established beforehand, creates a data specifier that begins with "ACQUISITION" using the URI that indicates the storage location of the related data. In the case where the data quantity of the related data does not exceed the threshold, the system controller part 11, using that related data, creates a data specifier that begins with "DATA". At that point, the system controller part 11 adds, to the e-mail created previously, delivery instruction tags that include between them the data specifier created.

Then, the system controller part 11, in the liquid-crystal display of controlling element 16, displays a message for the operator that prompts input of a message for the user of mobile device MS. The operator, in response to that message, enters a message like "This mail includes data that can be used in your downloaded Java application. Please press the '*' button."

When input by the operator of the message for user of mobile device MS is complete, the system controller part 11 adds the message entered to the e-mail created previously. As a result, the e-mail as shown in FIG. 3 is created.

Then, the system controller part 11 runs the mailer and addresses all e-mail created, using the mail addresses temporarily stored previously in RAM (i.e. "aa@aa.ne.jp", "bb@bb.ne.jp", etc.) and sends the e-mail messages created.

The e-mail transmitted from IP server W is push-distributed from gateway server GWS to mobile device MS.

Figure 13:
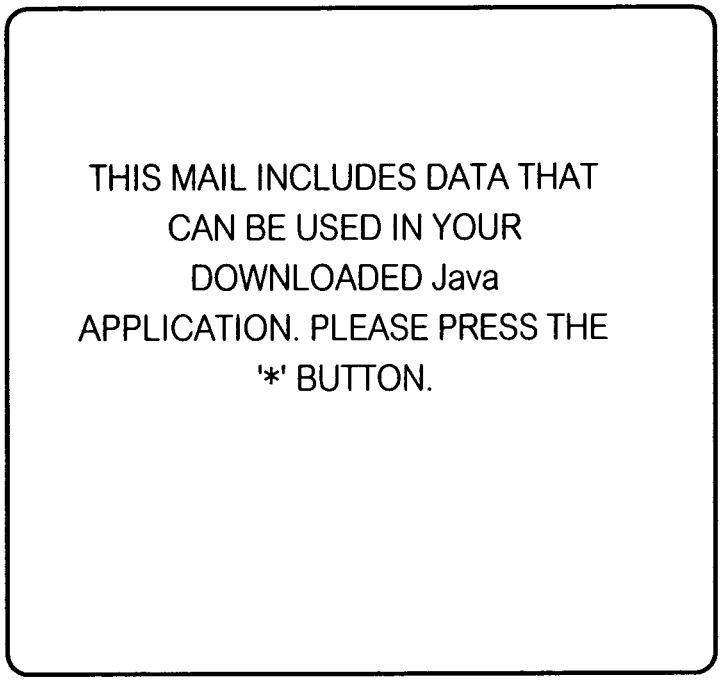
FIG. 13 is a diagram showing a screen shown in mobile device's display for the first preferred embodiment of the present invention.

The CPU211 of mobile device MS receives the e-mail sent from IP server W and stores the e-mail received in received mail memory area 2143. After that, when the user, using input part 23 of mobile device MS, performs a display operation for the received mail, the CPU211 displays, in display part 24, a list of the received mail stored in received mail memory area 2143. Then, when the user performs a display operation for the e-mail received from IP server W, the CPU211 reads out from received mail memory area 2143 the e-mail selected, and the CPU211 is made to show in display part 24 the message of the e-mail read out. FIG. 13 is a figure that shows the display screen for an e-mail message that has been received from IP server W.

Figure 14:
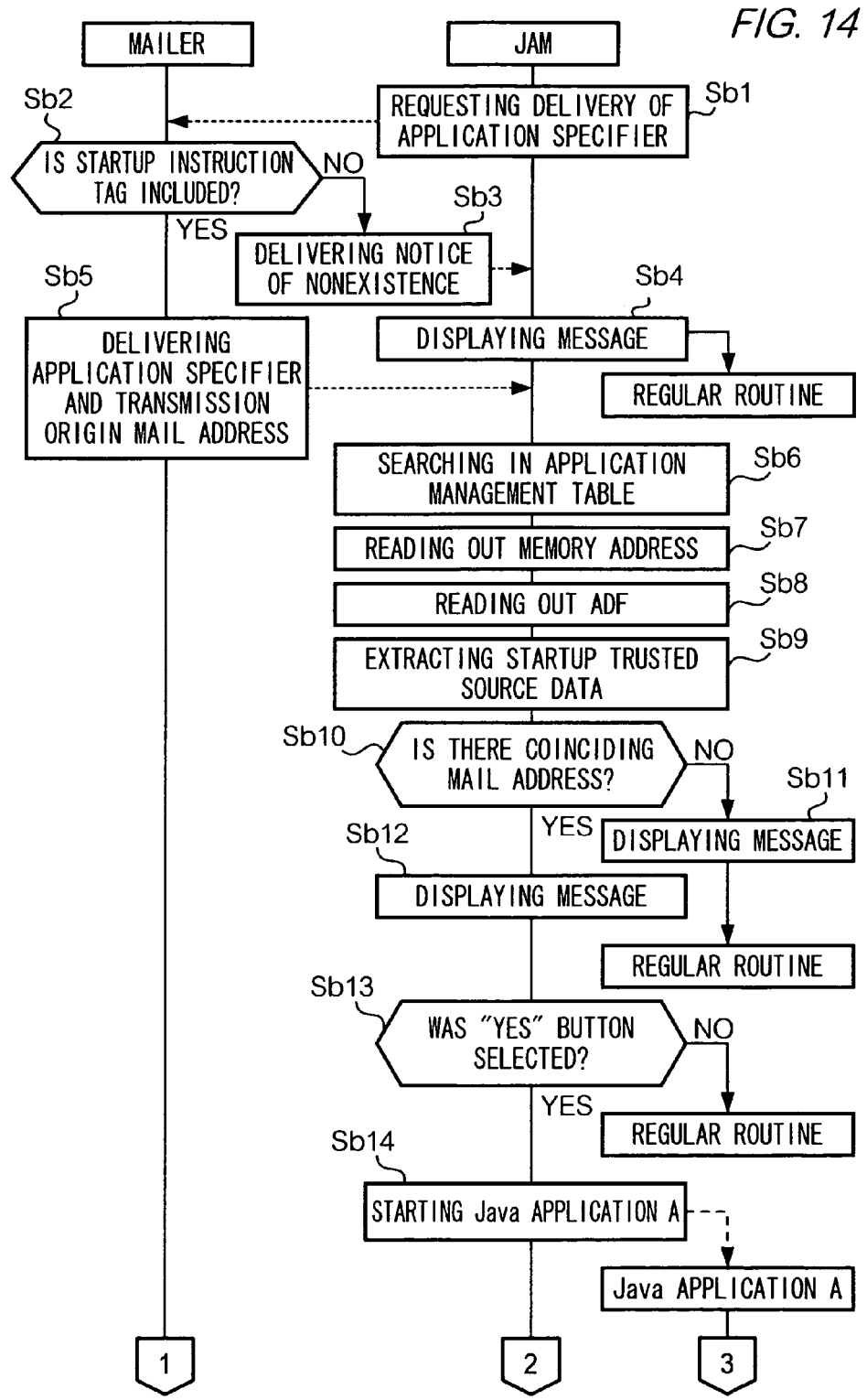
FIG. 14 is a diagram showing operations performed by mobile device's CPU for the first preferred embodiment of the present invention.

The message of the display screen of FIG. 13 is displayed, and the user presses a predetermined button of input part 23, for example the "*" button. In response to that operation, the CPU211 executes a startup operation for the Java application and a delivery operation for the related data. Hereinafter, using FIG. 14 and FIG. 15, all of these operations are explained.

Moreover, in the following explanation, the actual operations CPU211 performs in accordance with "mailer", "JAM" or "Java application A" will be conveniently expressed as 'operations performed by "mailer", "JAM" or "Java application A"' and the like. For example, in the case where "JAM reads outs the memory address" is written below, for all practical purposes that wording signifies "the CPU211 reads out the memory address in accordance with JAM."

First, JAM, in response to the user's downward press of the "*" button, performs a delivery request to the mailer of the application specifier that has been included in e-mail (step Sb1). The mailer, in response to the application specifier delivery request, first (step Sb2) determines whether a startup instruction tag is included in the e-mail received. In the case where the result of the decision of step Sb2 was "No", the mailer delivers to JAM a notice of nonexistence indicating that the application specifier is not included in the e-mail (step Sb3). When JAM receives from the mailer the notice of nonexistence of the application specifier, after it displays a message screen such as "Java application specification failed" (step Sb4), and returns to the regular routine of mobile device MS.

On the other hand, in the case where the result of the decision of step Sb2 was "Yes", the mailer extracts from e-mail the application specifier described between startup instruction tags, i.e. the URI "http://WWW.??.co.jp/$$a" of the ADF for Java application A, and the transmission origin mail address "pp@pp.ne.jp" of the e-mail, and delivers those to JAM (step Sb5). When JAM receives the URI of the ADF and the transmission origin mail address, it temporarily stores those to RAM213.

Then, JAM, finds the row in application management table TBL1 specified by the URI "http://WWW.??.co.jp/$$a" of the ADF temporarily stored to RAM213 (step Sb6). JAM reads out memory address "#0001" stored in the row found and temporarily stores the memory address read out to RAM213 (step Sb7).

Then, JAM extracts the ADF from application body memory areas 2141-k1 specified by the memory address "#0001" read out, and temporarily stores it in RAM213 (step Sb8). JAM extracts a startup trusted source data from the ADF read out (step Sb9). JAM determines whether there is, inside the mail address included in the startup trusted source data extracted, a part that coincides with the transmission origin mail address "pp@pp.ne.jp" temporarily stored in RAM213 previously (step Sb10). This decision is a decision to confirm whether the startup instruction for Java application A included in the e-mail is something that was sent from a transmission origin that has been determined to be trusted by the manager or the like of IP server W, the supplier origin of Java application A.

Moreover, when comparing a mail address included in startup trusted source data with the transmission origin mail address of the e-mail, it may compare with a section of the mail address instead of comparing the entirety. For example, when comparing only a part of a domain name like "@pp.ne.jp", it is not an individual mail address, but rather the group entirety of mail addresses transmitted through a specific server, that is regarded as being e-mail that has been transmitted from a trusted transmission origin.

In the case where the result of the decision of step Sb10 was "No", after JAM displays a message screen such as "Because security not guaranteed, can't start Java application A from this e-mail" (step Sb11), and returns to the regular routine of mobile device MS.

On the other hand, in the case where the result of the decision of step Sb10 was "Yes", JAM displays a message screen such as "Start Java Application A?" (step Sb12). This message screen includes a "Yes" button and a "No" button. When the user performs an operation for that message screen that selects any button, JAM decides whether it was the "Yes" button that was selected (step Sb13). In the case where the user performed a button selection operation "No", JAM gets "No" as the result of step Sb13. In that case, JAM returns to the regular routine of mobile device MS In the case where the user performed an operation selection of "Yes", JAM gets "Yes" as the result of step Sb13. In that case JAM reads the stored JAR file from application body memory area 2141-$k$1 specified by memory address "#0001" temporarily stored in RAM213, runs the Jar file read out and starts Java application A (step Sb14). The above is the startup operation for a Java application.

Then, JAM performs a delivery request to the mailer for the data specifier included in the e-mail (step Sb15). The mailer, in response to the data specifier delivery request, determines whether a delivery instruction tag is included in the e-mail received (step Sb16). In the case where the result of the decision of step Sb16 was "No", the mailer delivers to JAM a notice of nonexistence that shows that no such data specifier was included in the e-mail (step Sb17).

When JAM receives a notice of the nonexistence of the data specifier, it displays a message screen such as "Failure of data acquisition" in display part 24 (step Sb18), and returns to the regular routine of mobile device MS.

On the other hand, in the case where the result of the decision of step Sb16 was "Yes", the mailer extracts the data specifier from between the delivery instruction tags of the e-mail and delivers the data specifier extracted to JAM (step Sb19).

When JAM receives a data specifier, after the data specifier received is temporarily stored in RAM213, it extracts the delivery trusted source data from the ADF temporarily stored in RAM213 (step Sb20). JAM determines whether there is some part inside the mail address included in the delivery trusted source data extracted that coincides with the transmission origin mail address "pp@pp.ne.jp" temporarily stored in RAM213 previously (step Sb21). This decision is a decision to confirm whether the delivery instruction for Java application A included in the e-mail is something that was sent from a transmission origin that has been determined to be trusted by the manager or the like of IP server W, the supplier origin of Java application A.

Moreover, when comparing a mail address included in delivery trusted source data with the transmission origin mail address of the e-mail, it is permissible to compare with a section of the mail address instead of comparing the entirety.

In the case where the result of the decision of step Sb21 was "No", JAM displays in display part 24 a message screen such as "Because of security issues, can't use data included in this e-mail" (step Sb22), and returns to the regular routine of mobile device MS On the other hand, in the case where the result of the decision of step Sb21 was "Yes", JAM displays a message screen such as "Use the data in this e-mail?" (step Sb23). This message screen includes a "Yes" button and a "No" button. When the user performs an operation that selects any button for that message screen, JAM decides whether it was the "Yes" button that was selected (step Sb24).

In the case where the user performed a button selection operation of "No", JAM gets "No" as the result of step Sb24. In that case, JAM returns to the regular routine of mobile device MS.

On the other hand, in the case where the user performed a button selection operation "Yes", JAM gets "Yes" as the result of step Sb24. In that case, JAM determines whether the data specifier temporarily stored in RAM213 begins with "DATA" (step Sb25).

In the case where the result of the decision of step Sb25 was "Yes", JAM delivers to Java application A the substantive data included after the "DATA" of the data specifier (step Sb26).

On the other hand, in the case where the result of the decision of step Sb25 was "No", JAM, based on the URI included after "ACQUISITION" in the data specifier for the substantive data, acquires the substantive data (step Sb27). More specifically, JAM sends to mobile packet communications network MPN a GET request that includes the URI included after "ACQUISITION" and the identifier of mobile device MS. In response to that GET request, from the location specified by the URI, the substantive data is transmitted to mobile device MS, and the mobile device MS receives that data. When JAM, in response to the GET request, acquires the substantive data that is transmitted, it delivers to Java application A the data acquired (step Sb26). Afterward, JAM returns to the regular routine of mobile device MS.

When, in step Sb26, Java application A receives the substantive data from JAM, Java application A stores the substantive data accepted in application memory area 2141-$k$ that includes application body memory area 2141-$k$1, and in application related data memory areas 2141-$k$2 which are grouped with application body memory area 2141-$k$1 (step Sb28). That is to say, when, for example, Java application A is assumed to be stored in application body memory area 2141-11, the CPU211 stores the substantive data that is delivered to Java application A in application related data memory area 2141-12.

The data that has been stored in application related data memory area 2141-$k$2 becomes available to Java application A. The above describes the related-data delivery operation.

As mentioned above, a mobile device MS according to this embodiment starts a Java application on the basis of a startup instruction tag in e-mail received, and at the same time, on the basis of a delivery instruction tag in the e-mail from the mailer, delivers data to the mobile device MS. Accordingly, the IP server W manager and the like, simply by sending e-mail to mobile device MS, can provide any kind of data that is used for a Java application stored in mobile device MS.

For example, the manager or the like of IP server W, due to the fact that IP server W transmits e-mail, becomes capable of performing updates of a Java application that has been downloaded by mobile device MS. As well, for example, if the Java application downloaded from IP server W is a Role Playing Game (RPG) application, due to the fact that the IP server W manager transmits e-mail, the manager becomes capable of providing the game with data for a new character. As well, for example the IP server W manager or the like, due to the fact that it transmits e-mail that includes time value data such as data on weather forecasts and stock price, become capable of starting a Java application that performs displays like weather maps and stock price charts for mobile device MS and initiating the display of complex figures and the like that is difficult to compose with ordinary e-mail.

When a mobile device MS according to this embodiment is given the above capability, it can determine whether it is permissible to perform operations specified by startup instruction tags or delivery instruction tags included in e-mail, based on a startup trusted source data or a delivery trusted source data referred to in the ADF of a Java application and on the transmission origin mail address of the e-mail; and, only in the case where it has been confirmed by that decision that the source of the e-mail is trusted, executes the operation according to the startup instruction tag or delivery instruction tag. Accordingly, information security in mobile device MS is guaranteed either by not having started a Java application stored in mobile device MS with a startup instruction tag or delivery instruction tag included in e-mail produced by an untrusted third party, or by not having delivered untrusted data to that Java application.

As well, the mobile device MS, according to this embodiment, before performing a Java application startup or delivering data for that Java application, requires acknowledgement of these actions by user. Accordingly, it is avoided that startup of Java application is performed without intention of the user, and it is also avoided that data is delivered to that Java application without intention of the user.

As well, in the e-mail that a mobile device MS according to this embodiment receives, it is permissible to include startup instruction tags that include the URI of any Java application and delivery instruction tags that include any data, that have been designated by the operator of IP server W. Accordingly, the operator, due to the fact that the e-mail includes the URI of the Java application and data desired, can start any Java application that has been downloaded to mobile device MS or can provide any data to a Java application.

As well, when the operator of IP server W produces e-mail that includes startup instruction tags and delivery instruction tags, then, based on the URI of the Java application identified by the startup instruction tags, the mail address of the mobile device MS that downloaded that Java application is acquired automatically from user management DB 14 and is established as the address of the e-mail. For that reason the operator, by not having been designated the addresses of e-mail, can transmit e-mail for multiple mobile devices MS.

Moreover, this embodiment uses "<MOVE>" "</MOVE>" and "<IMPORT>" "</IMPORT>" character strings as startup instruction tags and delivery instruction tags; however, it is permissible to use other character strings. As well, this embodiment employs application specifiers and data specifiers using as parameter tags "<param>" "</param>" between startup instruction tags and delivery instruction tags; however, the method of specification of this information is not restricted to methods that use parameter tags.

Moreover, in this embodiment, startup instruction tags and delivery instruction tags are separately employed for instructing startup of a Java application and delivery of related data to the Java application. However, due to the fact that it uses tags that include both application specifier and data specifier, e.g., <IMPORT><param>"(ADF's URI)"</param><param>"DATA\12345\"</param></IMPORT>, using only one tag is permissible.

As well, in this embodiment, the user management DB14, concerns each Java application that has been stored in IP server W, has stored in it the mail addresses of all mobile devices MS that downloaded the Java application, and has become a composition that can include, as e-mail recipients, the mail addresses of all of the mobile devices that downloaded the Java applications designated by the operator.

However, among the mobile devices MS that downloaded the Java application, it may designate as recipients of the e-mail only a portion of the mail addresses of mobile devices MS. For example, IP server W can have a web page that accepts e-mail distribution applications and, it may transmit e-mail only for mobile devices MS which are indicated in the distribution accepted in that web page. In that case, user management DB 14 may only stores the mail addresses of mobile devices MS for which an application for distribution has been made.

Moreover, in this embodiment the gateway server GWS is constructed so as to push-distribute e-mail for mobile devices MS; however the form of e-mail distribution for mobile devices MS from gateway server GWS is not restricted to push distribution. For example, when a gateway server GWS has received e-mail that was addressed to a mobile device MS, it sends an arrival notice to mobile device MS and, only in the case where mobile device MS that received that arrival notice performs an e-mail send request to gateway server GWS, the gateway server GWS may send to mobile device MS e-mail that was addressed to mobile device MS.

2: Second Preferred Embodiment

In the above first preferred embodiment, IP server W provides various data for Java applications stored in mobile device MS by sending e-mail for mobile device MS that includes startup instruction tags and delivery instruction tags. Regarding the communication system according to second preferred embodiment, by receiving HTML data that corresponds to web pages stored in IP server W, IP server W provides various data for Java applications stored in mobile device MS.

[2.1: Composition]

According to this embodiment, the composition of the whole system, including the composition of the IP server, and the composition of the mobile device, is very similar to that of the first preferred embodiment. Accordingly, hereinafter, the discussion regarding this embodiment concerns only the differences with the first embodiment. In particular, symbols used in the first embodiment will be used for the same as those in this embodiment.

First, the nonvolatile memory that IP server W, according to this embodiment, contains in its system controller part 11, stores various HTML data each of which corresponds to a web page (hereinafter "data supplier page") for providing for mobile device MS various data used when a Java application, which was provided to mobile device MS from IP server W, is executed in mobile device MS.

FIG. 16 is a figure that illustrates the contents of the HTML data corresponding to a data supplier page. In HTML data various tags are included that show all the elements that compose the page, i.e. the construction of "<HEAD>" and "</HEAD>" for the HEAD tag, the construction of "<TITLE>" and "</TITLE>" for the TITLE tag and so on. For example, the data included between the HEAD tags is data that shows the contents of the header part of the web page. In HTML data corresponding to the data supplier page of this embodiment, in addition to various tags generally used such as the HEAD tag, a tag with a format like "<IMPORT"http://H??.ne.jp/$$a#xx#"></IMPORT>" is included. Hereafter, a tag of this form is called the IMPORT tag. The IMPORT tag is a tag that also holds information for both the startup instruction tag and the delivery instruction tag of the first preferred embodiment.

With the IMPORT tag, the "http://??.ne.jp/$$a" following "<IMPORT" is indicating, as specification information of a Java application, the URI of the Java application. I.e., this information is identical to the application specifier of the first preferred embodiment and, in this embodiment as well we call this information the application specifier.

As well, regarding the IMPORT tag, the part surrounded by "#" following "http://??.ne.jp/$$a", i.e. the "xx", shows the substantive data or the URI of the available substantive data which are used when the Java application specified by the application specifier is executed in mobile device MS. I.e., the "xx" is identical to the data specifier in the first preferred embodiment and, also for this embodiment, the part corresponding to "xx" is called the data specifier.

In this embodiment, whether a data specifier includes substantive data or the URI of substantive data is distinguished, as in the first preferred embodiment, by whether the data specifier begins with "DATA" or with "ACQUISITION".

Instead of supplying data to mobile device MS by e-mail from IP server W as in the first preferred embodiment, in this embodiment, data is supplied by HTML data that corresponds to a data supply page.

Accordingly, an IP server W according to this embodiment does not need to contain a mailer and user management DB 14. However, an IP server W in this embodiment may also have the function of data supply by e-mail of the first preferred embodiment.

As well, a mobile device MS according to this embodiment, instead of the function that performs the receiving of data using application specifiers and data specifiers included in e-mail received by the mailer, contains a function to perform download of data using application specifiers and data specifiers included in a data supply page acquired by the WWW browser.

The ADF of the Java application according to this embodiment includes, as in the first preferred embodiment, a startup trusted source data and a delivery trusted source data. However, in the startup trusted source data and the delivery trusted source data according to this embodiment, as data that indicates the source of data previously trusted by the manager of IP server W, instead of the transmission origin mail address of the e-mail in the first preferred embodiment, the URI of the download origin of the HTML data is included.

[2.2: Operations]

Hereinafter the operations of this embodiment are explained. Prior to the user of mobile device MS using the Java application, first there is a need to download that Java application from IP server W. In a Java application download of this embodiment, there is no need for mobile device MS to transmit the mail address of mobile device MS to IP server W when it transmits the specifier of the Java application that the user of mobile device MS desires to download. As well, the IP server W does not need to store in user management DB 14 the mail address of mobile device MS that has downloaded the Java application. As for the other actions that concern download in this embodiment, because they are the same as in the first preferred embodiment, the explanation is omitted.

Moreover, in the following explanation, application memory areas 2141-k of mobile device MS are assumed to be already storing the bodies and related data of respective Java applications, and the application management table memory area 2142 is assumed to be storing in application management table TBL1 the contents shown in FIG. 8. As well, the URI of the data supply page is assumed to be "http://WWW.pp.co.jp/dd.html".

In this embodiment, due to the fact that the user of mobile device MS performs an operation to acquire data to be used when the Java application downloaded to mobile device MS is executed, the startup operation of Java application and the delivery operation of the related data are begun. Hereinafter, by example, the actions of mobile device MS are explained in the case where the user of mobile device MS acquires data to be used when Java application A is executed. Moreover, the URI of Java application A is assumed to be as in the first preferred embodiment: "http://WWW.??.co.jp/$$a".

First, the user, by operating input part 23 of mobile device MS, inputs the URI "http://WWW.pp.co.jp/dd.html" for HTML data that corresponds to the data supply page of IP server W. In response to that input operation, the CPU211 of mobile device MS executes the WWW browser and sends to mobile packet communications network MPN the entered URI "http://WWW.pp.co.jp/dd.html" and a GET request that includes the identifier of mobile device MS.

The GET request sent from mobile device MS is received by IP server W through gateway server GWS and internet INET on the basis of the URI "http://WWW.pp.co.jp/dd.html". When the system controller part 11 of IP server W receives the GET request, in accordance with WWW server program, it sends the HTML data corresponding to data supply page in GET request together with the identifier of mobile device MS to internet INET. The HTML data sent from IP server W is received by mobile device MS through gateway server GWS and mobile packet communications network MPN on the basis of the identifier of mobile device MS. When CPU211 of mobile device MS receives the HTML data, in accordance with the WWW browser, it composes a web page based on the HTML data received and displays the web page composed, i.e. the data supply page, in display part 24.

FIG. 17 is a figure that shows data supply page that is displayed in display part 24 of mobile device MS. In the data supply page, for example, there is a message like "Select button corresponding to Java application you downloaded to obtain data to be used for that Java application." Below, there are buttons corresponding to the respective Java applications that IP server W has stored. The buttons respectively corresponding to these Java applications are put into correspondence with IMPORT tags. In the IMPORT tag is included, as application specifier, the URI of the ADF of the Java application that corresponds to the button to which the URI has been put into correspondence, or, as data specifier, substantive data or the URI of the substantive data to be used at the point of execution of that Java application.

Figure 18:
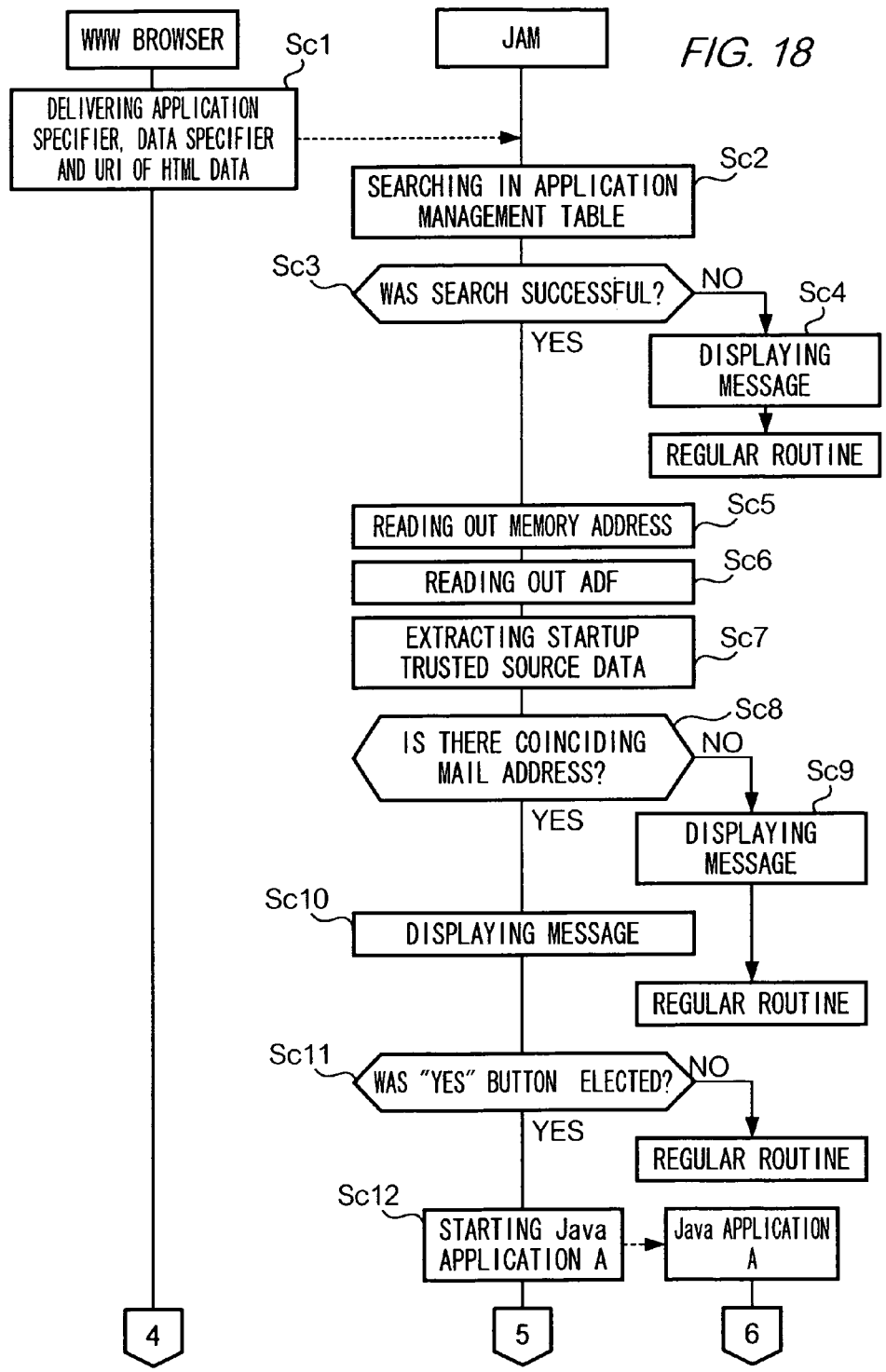
FIG. 18 is a diagram showing operations performed by mobile device's CPU for the second preferred embodiment of the present invention.
Figure 19:
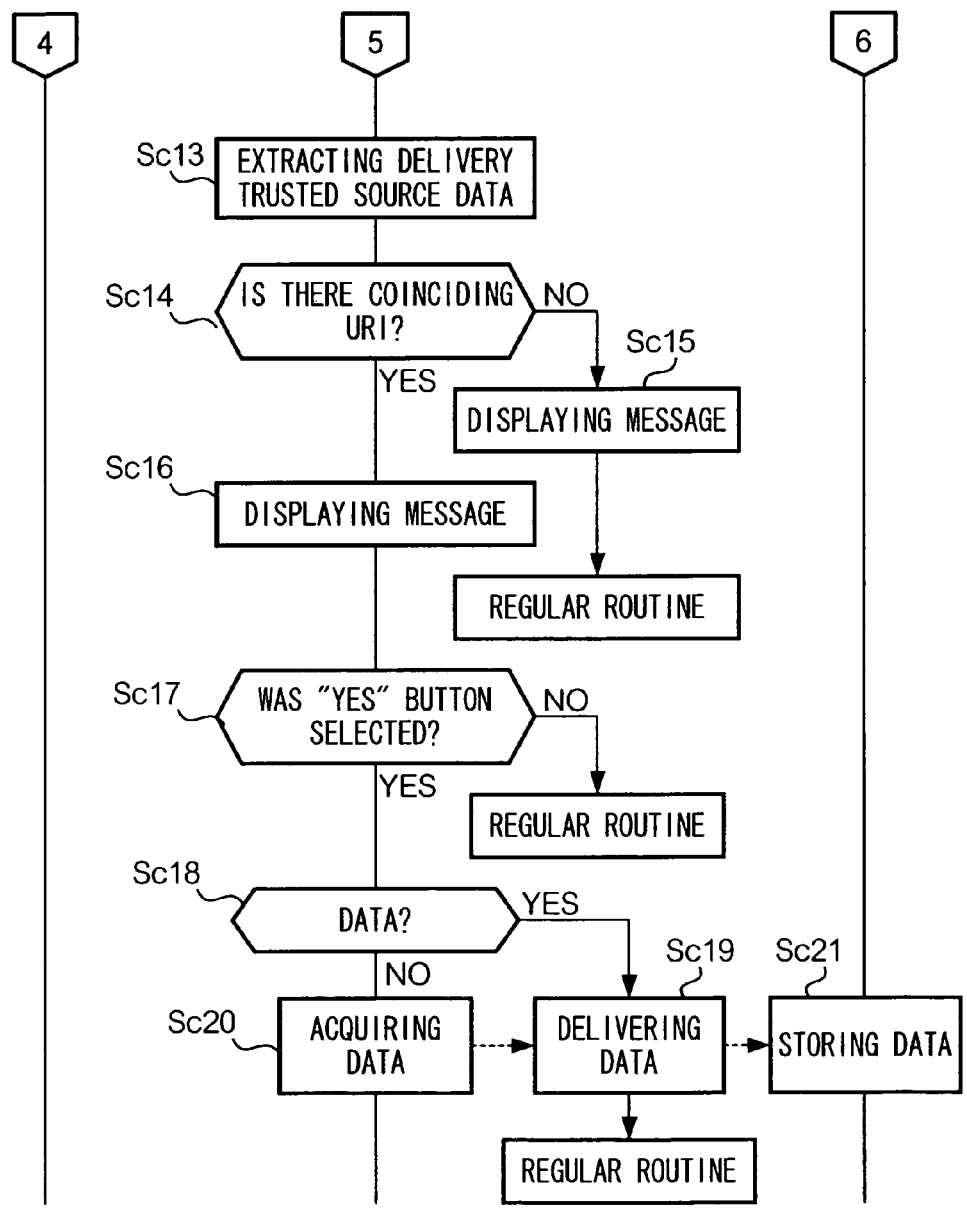
FIG. 19 is a diagram showing operations performed by mobile device's CPU for the second preferred embodiment of the present invention.

In the situation where the data supply page is shown in display part 24, the user, by operating input part 23, selects the "Java application A" button. In response to that choice operation, the CPU211 executes a Java application startup operation and a related data delivery operation. Hereinafter, using FIG. 18 and FIG. 19, these operations are explained.

Moreover, in the following explanation, when it is described that "the WWW browser", "JAM" or "Java application A" performs operations, it should be understood as a convenient way for describing that CPU211 performs those operations in accordance with "the WWW browser", "JAM" or "Java application A".

First, the WWW browser delivers to JAM the application specifier "http://WWW.??.co.jp/$$a" in the IMPORT tag corresponding to the "Java application A" button selected by the user, the data specifier, and the URI "http://WWW.pp.co.jp/dd.html" of HTML data corresponding to the data supply page (step Sc1).

When JAM receives the application specifier, the data specifier and the URI of HTML data from WWW browser, it temporarily stores those in RAM213. JAM then searches, in application management table TBL1, the row indicated by the application specifier "http://WWW.??.co.jp/$$a" received (step Sc2). Then, JAM determines whether it succeeded in the search of step Sc2 (step Sc3).

In the case where the application specifier "http://WWW.??.co.jp/$$a" is not in any row of application management table TBL1, JAM failed in the search of step Sc2, and JAM gets "No" as the decision result of step Sc3. In that case, after it displays a message screen such as "The selected Java application has not been downloaded" (step Sc4), JAM returns to the regular routine of mobile device MS.

On the other hand, in the case where the application specifier "http://WWW.??.co.jp/$$a" is found in a row of application management table TBL1, i.e. in the case where Java application A has been downloaded to mobile device MS, JAM succeeds in the search of step Sc2, and JAM gets "Yes" as the decision result of step Sc3. In that case JAM performs the following series of operations.

Step Sc5: read out memory address from found row.

Step Sc6: read out ADF of Java application A corresponding to memory address read out.

Step Sc7: extracts startup trusted source data included in ADF read.

Step Sc8: decision of whether there is a coinciding email address that coincides with the email address included in startup trusted source data extracted.

Step Sc9: display of message in case where decision result of step Sc8 was "No".

Step Sc10: display of message of confirmation of startup for user.

Step Sc11: decision of whether "Yes" button has been selected by user.

Step Sc12: startup of Java application A.

The operations of the above steps Sc5 through Sc12 correspond to steps Sb7 through Sb14 respectively (see FIG. 14) of the first preferred embodiment. However, in the first preferred embodiment, it is determined whether the transmission origin mail address of the e-mail is included in the startup trusted source data in operation of step Sb10, whereas in this embodiment is it determined whether the transmission origin e-mail address of the e-mail is included in the startup trusted source data in the operation of step Sc8, which corresponds to step Sb10. As for the rest, because the operations of steps Sc5 through Sc12 in this embodiment are the same as steps Sb7 through Sb14 in the first preferred embodiment, further explanation is omitted.

In step Sc12, when JAM starts Java application A, JAM then performs the following series of operations.

Step Sc13: extraction of delivery trusted source data included in the ADF previously read out.

Step Sc14: decision of whether a URI that coincides with the URI of the HTML data is included in the delivery trusted source data extracted.

Step Sc15: display of message of case where decision result of step Sc14 was "No".

Step Sc16: display confirmation message for user about use of data.

Step Sc17: decision of whether "Yes" button has been selected by user.

Step Sc18: decision of whether data specifier begins from "DATA".

Step Sc19: delivery of substantive data for Java application A.

Step Sc20: acquisition of data in the case where data specifier begins with "ACQUISITION".

The operations of the above steps Sc13 through Sc20 correspond to steps Sb20 through Sb27 respectively (see FIG. 15) of the first preferred embodiment. However, in the first preferred embodiment, it is determined whether the transmission origin mail address of the e-mail is included in the delivery trusted source data in operation of step Sb21, whereas in this embodiment is it determined whether the URI of the HTML data is included in the delivery trusted source data in the operation of step Sc14, which corresponds step of Sb21, As for the remaining description, since the operations of steps Sc13 through Sc20 in this embodiment are the same as steps Sb20 through Sb27 in the first preferred embodiment, further explanation is omitted.

When, in step Sc19, Java application A receives the substantive data from JAM, Java application A stores the substantive data accepted in application related data memory areas 2141-$k2$ similarly to step Sb28 of the first proffered embodiment (step Sc20).

In performing steps as in the above, data stored in application related data memory 2141-$k2$ become available to Java application A.

By performing the above, a mobile device MS according to this embodiment has become a composition that acquires data to be used when a Java application is executed, according to an application specifier and a data specifier included in the HTML data received by the WWW browser. Accordingly, the manager of IP server W or the like, simply by previously storing in IP server W the HTML data of a data supply page that includes either the substantive data or the URI of the substantive data that he/she wants to provide for mobile device MS, can provide various data to be used when a Java application stored in mobile device MS is executed. At the same time, a user of the mobile device MS simply making the mobile device MS receive the HTML data corresponding to the data supply page from IP server W, can easily acquire various data to be used when the Java application stored in mobile device MS is executed.

According to this embodiment, as well as the mobile device MS gets the above kind of effect, it determines, based on the startup trusted source data or delivery trusted source data in the ADF of the Java application and on the URI that indicates the transmission origin of the HTML data, whether it may perform an operation according to the IMPORT tag included in the HTML data of the data supply page; and, by that decision, only in the case where it has been confirmed that the source of the HTML data is something trusted, it executes the operation according to the IMPORT tag. Accordingly, by not having started a Java application stored in mobile device MS or by not having delivered untrusted data to that Java application, using an IMPORT tag included in HTML data produced by an untrusted third party, information security in mobile device MS is guaranteed.

Moreover, this embodiment uses "<IMPORT"">" "</IMPORT>" character strings as tags to designate the application specifier and the data specifier however, it is permissible to use other character strings instead. As well, the specified format for application specifiers and data specifiers included between tags is not restricted to what has been mentioned; any format of the same capability may be used.

3: Third Preferred Embodiment

In the above first preferred embodiment, IP server W provides various data for Java applications stored in mobile device MS by sending e-mail for mobile device MS that includes startup instruction tags and delivery instruction tags. Regarding the communication system according to third preferred embodiment, among plural Java applications that have been downloaded from IP server W to the mobile device MS, related data of one Java application is provided for another Java application as data to be used at the point of execution of the Java application.

In this embodiment, a Java application stored in application DB 13 of IP server W and downloaded from IP server W to mobile device MS is designed so that, when it is executed in mobile device MS, creates data that is used by other Java applications and uses data that has been created by other Java applications.

[3.1: Construction]

According to this embodiment, the composition of the whole system, including the composition of the IP server, and the composition of the mobile device, is very similar to that of the first preferred embodiment. Accordingly, hereinafter, the discussion regarding this embodiment concerns only the differences with the first embodiment. In particular, symbols used in the first embodiment will be used for the same as those in this embodiment.

Moreover, in this embodiment, instead of carrying out supply of data from IP server W for mobile device MS by e-mail, it is providing data to Java applications in mobile device MS that was created by other Java applications.

Accordingly, the IP server according to this embodiment does not require a mailer or a user management DB 14. However, the IP server W of this embodiment may also include means for data supply by e-mail as in the first embodiment. Moreover, it may also provide the supply of data in HTML data as in the second embodiment.

As well, a mobile device MS according to this embodiment contains, instead of a function to perform receiving of data using application specifiers and data specifiers included in e-mail received by a mailer, a function that assumes that the data created by operations executed in accordance with one Java application will become available to operations executed in accordance with another Java application.

For example, it is provided that mobile device MS downloads from IP server W a Java application for virtually implementing in mobile device MS baseball game (hereinafter "game application"), and a Java application for training a virtual person as a player in that baseball game and establishing that person's various parameters (for example, batting average, running ability, pitching speed, variety of pitches, etc.) (hereinafter "training application"). In this case, a mobile device MS according to this embodiment can use the parameters of each player that were established by running the training application during the execution of the game application.

However, because the Java application is something downloaded through an open network like internet INET, it will not necessarily behave correctly. Accordingly, when mobile device MS unrestrictedly permits the use of data that has been created by a Java application in execution of other Java application, and for example, when the mobile device MS runs a Java application that was established for performing unfavorable operations, there is the possibility of producing an inconvenience such as private information and the like that user entered being transmitted externally without the user's intent.

To avoid the above inconvenience, the ADF of a Java application according to this embodiment includes, as with the first preferred embodiment, a startup trusted source data and a delivery trusted source data. However, in a startup trusted source data and a delivery trusted source data according to this embodiment, as data that indicates the source of the Java application trusted beforehand by the manager of IP server W, instead of the transmission origin mail address of an e-mail as in the first preferred embodiment, the URI of the download origin of the Java application is included.

That is to say, the startup trusted source data and the delivery trusted source data in the first preferred embodiment include as the contents the transmission origin mail address of the e-mail indicating the source of that data that is the application specifier and data specifier, and on the other hand, the startup trusted source data and the delivery trusted source data in this embodiment include not data that indicates the source of data, but data that indicates the source of the application that creates the data.

Accordingly, the CPU211 of mobile device MS acting on an application specifier that specifies another application, say Java application B, the application specifier having been created by operations of a Java application, say Java application A, determines whether to start Java application B based on the URI of the download origin of Java application A and its startup trusted source data. Similarly, the CPU211 of mobile device MS determines whether to use a data specifier that includes data created by operations of Java application A when it is executing Java application B, based on Java application A's download origin URI and its delivery trusted source data.

[3.2: Operations]

Hereinafter are explained the operations of this embodiment. Before the user of mobile device MS can use a Java application, first it is necessary to download that Java application from IP server W. In downloading of a Java application in this embodiment, when mobile device MS transmits to IP server W the specifier of the Java application that the user of mobile device MS wishes to download, there is no need to transmit the mail address of mobile device MS. As well, IP server W does not need to store in user management DB 14 the mail address of the mobile device MS that downloads the Java application. As for the other operations that concern downloading in this embodiment, because they are the same as in the first preferred embodiment, explanation is omitted.

Moreover, in the following explanation, the body of Java application A and related data are assumed to be already stored in application memory area 2141-1 of mobile device MS, and Java application A is assumed to be the mentioned training application. As well, it is assumed that the body of Java application B and related data are already stored in application memory area 2141-2 of mobile device MS, and that Java application B is assumed to be the mentioned game application. Moreover, the URIs of the download origins of Java application A and Java application B are assumed to be, respectively, "http://WWW.??.ne.jp/$$a" and "http://WWW.??.ne.jp/%%a" and, it is assumed that, in application management table memory area 2142, there is stored the application management table TBL1, with contents as shown in FIG. 8.

First, the user, by operating input part 23 of mobile device MS, performs a startup instruction for Java application A. In response to that input operation, CPU211 reads out from application body memory area 2141-11 a Jar file that has been stored, and starts Java application A on the basis of the Jar file read out.

After that, the CPU 211, due to performing various operations in accordance with Java application A, sequentially displays in display part 24 images and the like that prompt input operations that correspond to actions, such as pitching practice, batting practice and the like, that can change various parameter settings of the virtual baseball player. The user responds to these images and the like with various operations using input part 23, and the CPU 211, in accordance with Java application A, creates the parameters of the player in response to the user's operations. The parameters thus created, after being stored temporarily in RAM 213, are stored in application related data memory area 2141-12 by the user specifying execution of a save operation.

When the user, by operations that executed in Java application A, finishes creation of parameters for a player, the user, by operating input part 23, performs for mobile device MS an instruction to allow the parameters created to be used in operations executed in accordance with another Java application. In response to that instruction, the CPU211 refers to application management table TBL1 and shows a name list of Java applications downloaded already to mobile device MS in display part 24. In this list, the memory addresses that correspond to the storage locations of each Java application stored in application management table TBL1 are shown in correspondence with the names.

Moreover, the ADF or the like for each Java application may include information of Java applications that are allowed to use data created by that Java application, and CPU 211 may indicate in display part 24 a list that includes only names of Java applications allowed to used the data created by that application, not all of the Java applications downloaded to mobile device MS. In that case, the information about Java applications that are allowed to use the created data may be mentioned in the ADF previously prepared by the manager or the like of IP servers W that are the download origins for each Java application; alternatively, the information may be created by the user's setting operations and stored in application related data memory area 2141-$k$2.

Figure 20:
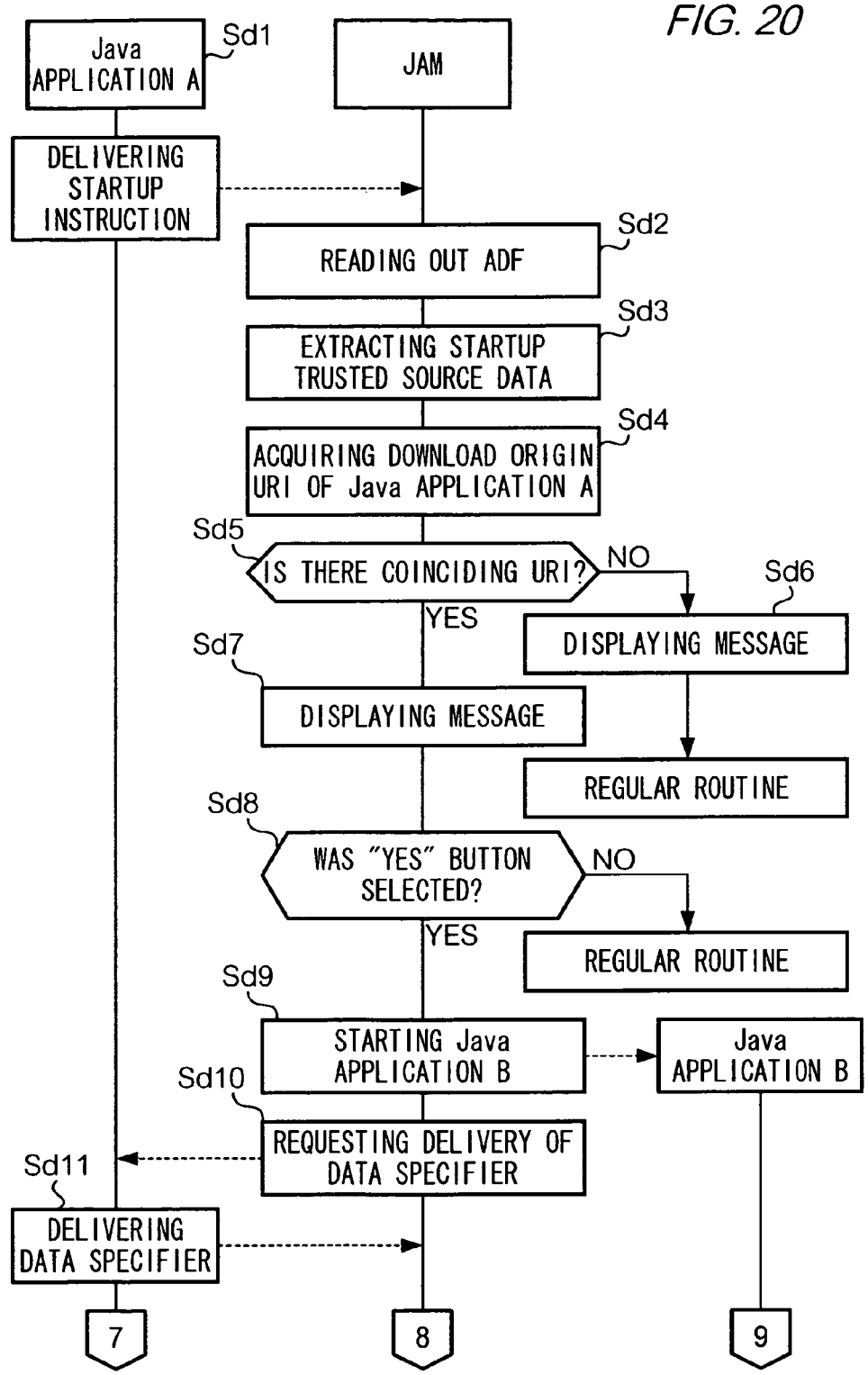
FIG. 20 is a diagram showing operations performed by mobile device's CPU for a third preferred embodiment of the present invention.
Figure 21:
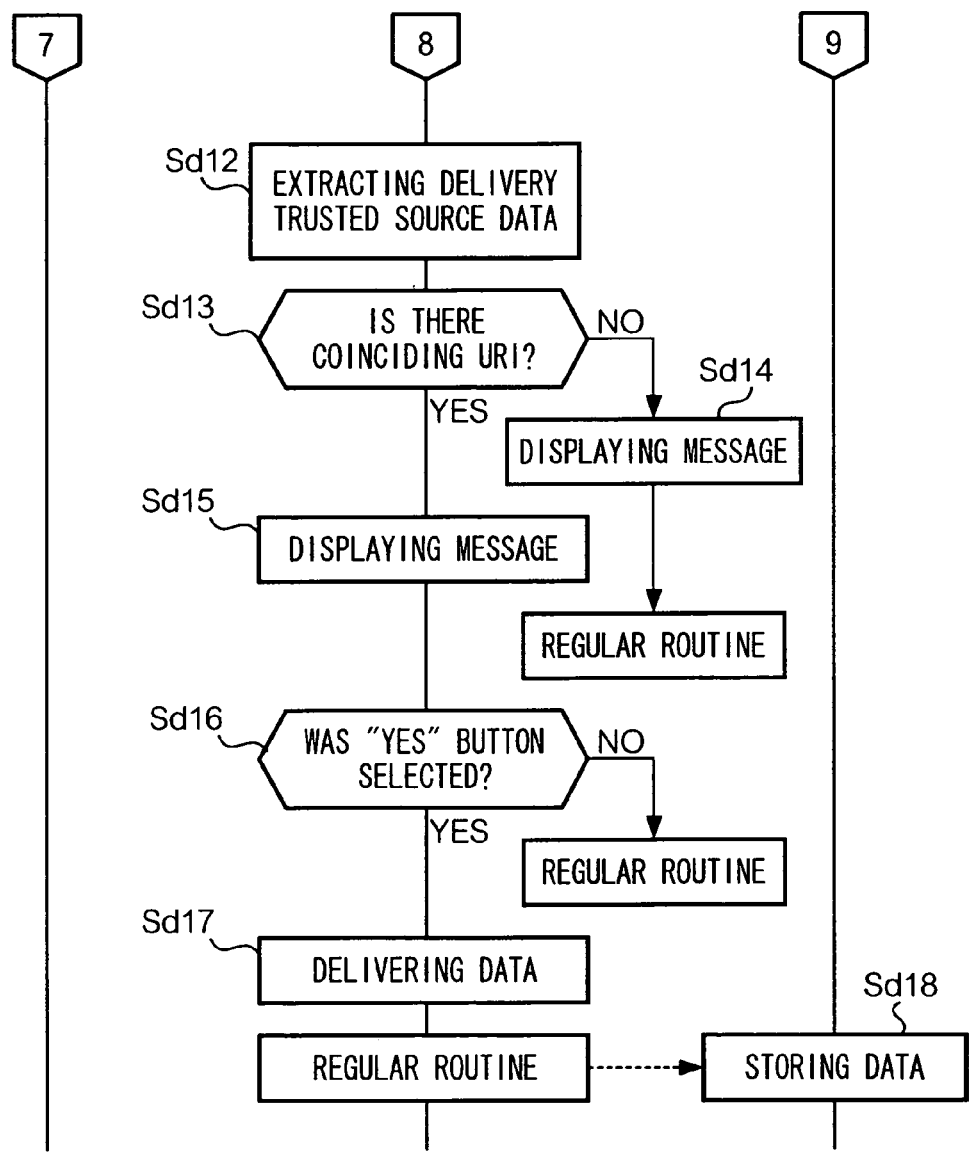
FIG. 21 is a diagram showing operations performed by mobile device's CPU for the third preferred embodiment of the present invention.

In the situation of the Java application name list shown in display part 24, the user, by operating input part 23, selects the "Java application B" button. In response to that choice operation, the CPU211 executes a startup operation of Java application B and a delivery operation of its related data. Hereinafter, using FIG. 20 and FIG. 21, these operations are explained.

Moreover, in the following explanation, when it is described that "Java Application A", "JAM" or "Java application B" performs operations, it should be understood as a convenient way for describing that CPU211 performs those operations in accordance with "Java Application A", "JAM" or "Java application A".

First, Java application A delivers to JAM a startup instruction that includes the memory address "#0002" of Java application B that has been selected by the user (step Sd1).

When JAM receives a startup instruction that includes memory address "#0002", it stores memory address "#0002" temporarily in RAM213. Then, JAM, from the application body memory area 2141-21 that is specified by the memory address "#0002" accepted, reads out the ADF of Java application B and stores it temporarily in RAM213 (step Sd2). Then, JAM extracts the startup trusted source data from the ADF read out and temporarily stores the startup trusted source data extracted in RAM213 (step Sd3).

Then, JAM looks in application management table TBL1, acquires the download origin URI "http://WWW.??.co.jp/$$a" of Java application A that executed the delivery of the startup instruction to JAM, and temporarily stores the URI acquired in RAM213 (step Sd4). JAM determines whether something that coincides with the URI "http://WWW.??.co.jp/$$a" of the download origin of Java application A acquired in step Sd4 is included in the startup trusted source data stored temporarily in RAM213 in step Sd3 (step Sd5). This decision is a decision to confirm whether Java application A, which executed the startup instruction of Java application B, is something that has been downloaded from a distribution origin that has been determined to be a distribution origin trusted by the manager or the like of IP server W, the supply origin of Java application B.

Moreover, when comparing the URI included in the startup trusted source data with the URI of Java application A, it is permissible to compare with a section of the URI instead of comparing the URI entirety. For example, if doing it so as to compare only part of the domain name like "@pp.ne.jp", it is not the URI that corresponded to an individual Java application but rather, it is the group entirety of Java applications downloaded from a specific server, that are regarded as Java applications downloaded from a trusted distribution origin.

In the case where the result of the decision of step Sd5 was "No", it displays a message screen such as "Because can't guarantee security, can't start Java application B from Java application A" in display part 24 (step Sd6); afterward, JAM returns to the regular routine of mobile device MS.

On the other hand, in the case where the result of the decision of step Sd5 was "Yes", JAM displays a message screen such as "Start Java Application?" in display part 24 (step Sd7). This message screen includes a "Yes" button and a "No" button. When the user performs selection of any button in this message screen, JAM decides whether it was the "Yes" button that was selected (step Sd8). In the case where the user performed a selection operation of the "No" button, JAM gets "No" as the result of step Sd8. In that case, JAM returns to the regular routine of mobile device MS.

In the case where the user performed a selection operation of the "Yes" button, JAM gets "Yes" as the result of step Sd8. In that case JAM reads the stored Jar file from application body memory area 2141-21 specified by memory address "#0002" temporarily stored in RAM213, and starts Java application B on the basis of the Jar file read out (step Sd9).

Then, JAM, for Java application A, requests a data specifier that indicates the substantive data that is to be delivered for Java application B (step Sd 10). When Java application A receives a data specifier request, it delivers the parameters of player stored previously in application related data memory area 2141-12 as a data specifier to JAM (step Sd11). In this embodiment, the data specifier is the substantive data.

When JAM receives the data specifier, after it stores temporarily in RAM213 the data specifier received, it extracts the delivery trusted source data from the ADF stored temporarily in RAM213 in step Sd2 (step Sd12). JAM determines whether the URIs included in the delivery trusted source data extracted includes a URI that coincides with the URI of the download origin of the Java application A stored temporarily in RAM213 in step Sd4 (step Sd13). This decision is a decision to confirm whether Java application A, which will be delivering parameters as data specifiers to Java application B, is something that has been downloaded from a distribution origin that has been determined to be a distribution origin trusted by the manager or the like of IP server W, the supply origin of Java application B.

Moreover, when comparing the URI included in the delivery trusted source data with the URI of the download origin of Java application A, instead of comparing the URI entirety, it is permissible to compare only a section of the URI.

In the case where the result of the decision of step Sd13 was "No", JAM displays a message screen such as "Can't guarantee security, so you can't use data created by Java Application A in Java Application B" in display part 24 (step Sd14), and JAM returns to the regular routine of mobile device MS.

On the other hand, in the case where the result of the decision of step Sd13 was "Yes", JAM displays a message screen such as "Use the data created by Java Application A in Java Application B?" in display part 24 (step Sd15). This message screen includes a "Yes" button and a "No" button. When the user performs selection of any button in this message screen, JAM performs a decision of whether the "Yes" button was selected (step Sd16).

In the case where the user performed a selection operation of the "No" button, JAM gets "No" as the result of step Sd16. In that case, JAM returns to the regular routine of mobile device MS.

In the case where the user performed a selection operation of the "Yes" button, JAM gets "Yes" as the result of step Sd16. In that case, JAM reads out from RAM213 the data specifier accepted in step Sd11 and delivers the data specifier read out to Java application B (step Sd17). After that, JAM returns to the regular routine of mobile device MS.

When, in step Sd17, Java application B receives from JAM the data specifier that is the substantive data, it stores in application related data memory area 2141-22 the substantive data received (step Sd18). Done as above, data has been stored in application related data memory area 2141-22 becomes available thereafter to Java application B.

Done as in the above, a mobile device MS according to this embodiment, has become a composition that performs the delivery of data among plural Java applications downloaded from IP server W. Accordingly, in this embodiment, it is possible, for example, for multiple Java applications to share multiple functions implemented in mobile device MS, that are related to each other and usually realized by one program.

As well, the CPU211 in a mobile device MS according to this embodiment has become a composition that determines, based on the startup trusted source data and the delivery trusted source data described in the ADFs of each Java application, and the URIs of the download origin that indicate the source of the Java applications, whether to perform the delivery of data among multiple Java applications. Accordingly, mobile device MS, according to this embodiment, is prevented from performing unintentional operations for the user that might be due to performing operations in accordance with Java applications using unfavorable data, and information security in mobile device MS is assured.

4: Modifications

The compliant forms mentioned are exemplifications of compliant forms of the present invention and, within the above compliant forms, one can make various modifications within a scope that does not deviate from the basic ideas of the present invention. Hereinafter, instances of some modifications are described.

4.1: First Modification

In the compliant forms mention, the Java application's body and related data are stored in nonvolatile memory 214 in mobile device MS. In the first modification, the mobile device MS can have installed in it a module for data memory use, such as a Subscriber Identity Module (SIM), or a User Identity Module (UIM), and in any of these modules is stored Java application bodies and their related data.

Figure 22:
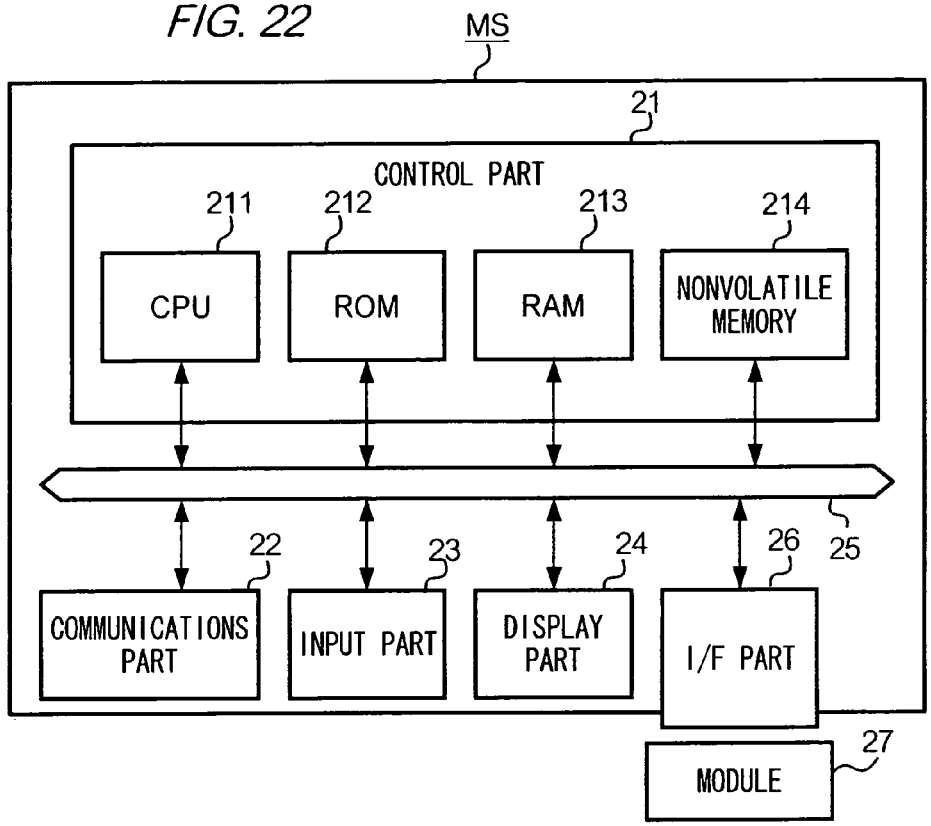
FIG. 22 is a block diagram showing a composition of a mobile device for a modified embodiment of the present invention.

FIG. 22 is a figure that shows the composition of mobile device MS according to the first modification. A mobile device MS according to the first modification, in addition to each component shown in FIG. 6, contains an I/F part 26. The control part 21 performs delivery of data between module 27 through I/F part 26.

Figure 23:
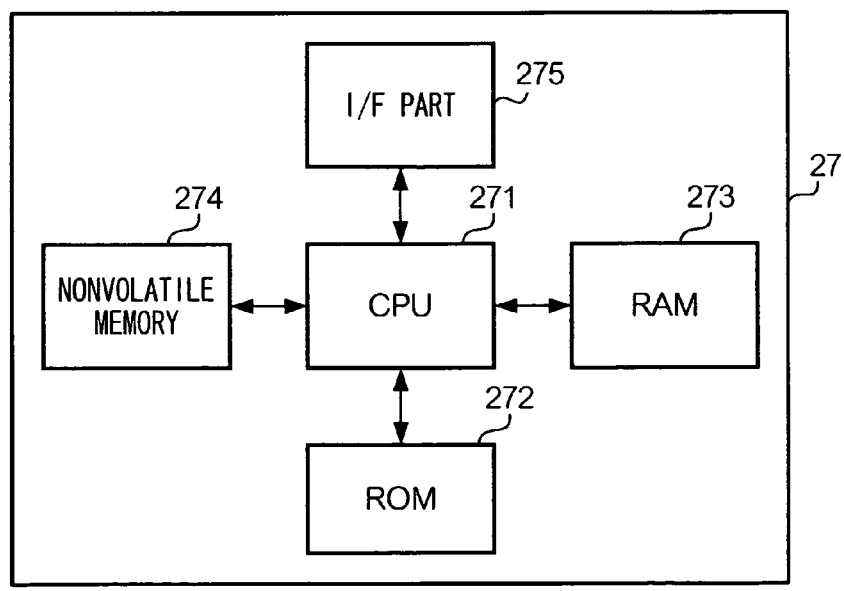
FIG. 23 is a block diagram showing a composition of a module for the modified embodiment of the present invention.

FIG. 23 is a figure that shows the composition of module 27. Module 27 contains CPU 271, ROM 272, RAM 273, nonvolatile memory 274, and I/F part 275. The I/F part 275 of module 27 relays delivery of data between CPU 271 and I/F part 26 in mobile device MS. ROM 272, aside from the various control programs to control module 27, has stored in it a program that specifies various data operations to be executed by CPU 271 using commands delivered from mobile device MS. Moreover, ROM 272 holds software to construct the Java execution environment assumed to be necessary when CPU 271 executes Java applications, Moreover, the Java execution environment constructed in module 27 may be the same as the Java execution environment (FIG. 9 reference) in control part 21 of mobile device M, or something different from the Java execution environment in control part 21 where, for example, functionality is limit based on throughput of a CPU 271 of module 27, memory quantity of RAM 273, and so on.

Nonvolatile memory 274, in addition to various memory areas that have been established in nonvolatile memory 214 of mobile device MS, contains an area to store mail addresses and numbers of affiliates.

CPU 271, due to the fact that it performs operations executed in accordance with programs stored in ROM 272 and nonvolatile memory 274, controls each component of module 27. RAM 273 is used as a work area where CPU 271 stores data temporarily.

In the first modification, the functions of CPU 211, ROM 212, RAM 213 and nonvolatile memory 214 of mobile device MS in the compliant form mentioned are carried out respectively by the CPU 271, ROM 272, RAM 273 and nonvolatile memory 274 of module 27.

I.e., due to the fact that CPU 271 performs operations in accordance with the mailer and WWW browser stored in ROM 272, it receives e-mail or HTML data that includes startup instruction tags and delivery instruction tags, through communications part 22, from IP server W. As well, CPU 271 establishes a Java execution environment compliant with J2ME or the like stored in ROM272, and performs in accordance with JAM the decision operations, startup operations, and Java application delivery operations of related data, and the like.

Moreover, the operations executed in accordance with, for example, the mailer and WWW browser may be executed by CPU211 of mobile device MS, and the operations executed in accordance with JAM may be executed by CPU271 of module 27.

This first modification becomes capable of delivery of data among multiple Java applications, even from Java applications stored in a module 27 that is freely removable from mobile device MS, such as a UIM.

4.2: Second Modification

A mobile device MS in the above-mentioned compliant form, in order to determine the trustworthiness of an application specifier or startup instruction that specifies startup of a Java application and of a data specifier that shows related data that is provided for the Java application, compares the transmission origin mail address of e-mail or the URI of the transmission origin of the HTML data, that indicates the source this data, or the URI of the download origin that indicates the source of the Java application that created this data, with the startup trusted source data or delivery trusted source data. At that time, mobile terminal MS, due to the fact that it compares only the part that indicates, for example, a mail address or URI domain name, can handle as trusted transmission origins not only specific transmission origins but transmission origins across a defined range.

In the second modification, mobile terminal MS may moreover flexibly perform comparison of mail addresses or URIs. For example, the user of mobile terminal MS, by establishing any condition, such as the case where specific character string is included somewhere in the head part or in the middle part of a mail address or URI, and only in the case where it satisfies that condition, permits startup of a Java application or delivery of related data for Java application.

4.3: Third Modification

In the compliant form mentioned, an e-mail address or a URI is being used as data that indicates the source of the startup trusted source data, the delivery trusted source data, the application specifier, the startup instruction and the data specifier. In the third modification, other information, apart from the e-mail address and URI, is used as the data that indicates the source of the data or application.

For example, in the mail system of a mobile phone device, the telephone number can be used as an e-mail address. Similarly, in a communication system according to the present invention, as the source of the data or the application, a telephone number of a mobile terminal MS or an IP server W can be used. In such a case, for example in the case where a telephone number that indicates an address of transmission origin of data is unnoticed, and in the case where the transmission origin is a public telephone, it will be possible to not use that data when executing the Java application. As well, if done so as to determine the transmission origin of data by a telephone number, mobile device MS can discriminate whether the data transmission origin is a landline telephone or a mobile phone device. As well, mobile device MS can, from telephone number, discriminate geographic information of data transmission origin or telecommunications carrier. Accordingly, due to the fact that mobile device MS uses the telephone number as data that indicates the source of data, in response to the geographic information of the data transmission origin or to the telecommunications carrier that relayed the transmission of data, it can determine whether to use that data when a Java application is executed.

As well, apart from telephone numbers, any other kind of information that can specify transmission origins or ranges of transmission origins, such as the IP address, may be used in present invention.

4.4: Fourth Modification

A mobile device MS in the fourth modification, determines whether to perform startup of the Java application and whether to use data in accordance with an application specifier and a data specifier included e-mail or HTML data received from external telecommunications equipment such as IP server W, or in accordance with data that has been created by operations executed in accordance with a Java application, based on information established beforehand by the user, in addition to contents of the startup trusted source data and delivery trusted source data in the compliant form mentioned.

Mobile device MS, when it initially starts a Java application, displays a settings screen for permission/non-permission that concerns startup of a Java application and delivery of data. That settings screen includes buttons with messages like "startup by e-mail", "delivery of data by e-mail", "startup by HTML", "delivery of data by HTML data", "startup by another application", "delivery of data from another application", "startup by an external device", and "delivery of data by an external device." The "startup by external device" and "delivery of data by external device" are settings that are concerned with whether to start Java applications or use data in operations executed in accordance with a Java application, based on data sent from an external device, such as a PC or a PDA, to mobile device MS. In this case, the mobile device MS comprises a communications part for performing short-distance communications, such as infrared links, Bluetooth (registered trademark) and HomeRF (Home Radio Frequency), or wired communications, and receives data from the external device through the communications part.

In the case where the user, with the above settings screen, performs selecting operation and selects, for example, the "startup by e-mail" button, the user inputs the mail addresses that are thought to be those of trusted users and untrusted users that are transmission origins of the e-mail that includes application specifiers specifying startup of the Java application. Similarly, in the case where the user selected one of the other buttons, the user inputs the mail addresses, URIs, names of Java applications, etc. The mobile device MS stores the mail addresses and the like that the user entered in nonvolatile memory 214.

When Mobile device MS receives, for example, an e-mail including application specifiers and data specifiers, and the transmission origin address of that e-mail is included in startup trusted source data and delivery trusted source data, if the transmission origin address is not included in the mail addresses stored in nonvolatile memory 214 as trusted mail addresses that concerns "startup by e-mail" and "delivery of data by e-mail" by the user, it does not perform operations based on the application specifiers and data specifiers in that e-mail.

With this fourth modification, the user can manage the operations of mobile device MS so as to not perform startup of a Java application or delivery of data for a Java application based on e-mail or HTML data from untrusted sources, or on data created by operations of Java applications that the user does not trust.

4.5: Fifth Modification

In the fifth modification, when mobile device MS receives data delivered from a mailer, a WWW browser, or another Java application, it can performs not only startup of a Java application that has been downloaded from IP server W, or use of that data in operations executed in accordance with a Java application that has been downloaded, but also startup of a native application stored in nonvolatile memory 214 or startup of a Java application installed in mobile device MS from memory devices like CD-ROM, based on the data received, and use of the data received in operations in accordance with a native application.

4.6: Sixth Modification

In the sixth modification, the mobile device MS is capable of executing not only Java applications coded in Java programming language but also applications coded in languages other than Java programming language, and it decides whether to perform startup of the applications or use of data in the applications based on startup trusted source data and delivery trusted source data similarly to the above embodiments.

4.7: Seventh Modification

In the seventh variant, the startup trusted source data and the delivery trusted source data are not included in the ADF for each Java application, but stored in nonvolatile memory 214 of mobile device MS as a data file that is separate from the body of the Java application. The startup trusted source data and the delivery trusted source data may be constructed of respective separate data files, and may be constructed as a single file. As well, plural data files each including the startup trusted source data and delivery trusted source data for each Java application may be prepared, and a data file including the startup trusted source data and delivery trusted source data concerning multiple Java applications may be prepared.

4.8: Eighth Modification

In an eighth modification, the mobile device MS, for example, is not only delivering to Java application B substantive data created by operations executed in accordance with Java application A, but also delivering to Java application B data indicating the storage location of the substantive data such as a URI in accordance with Java application A, and accessing the substantive data based on the delivered data such as the URI in operations executed in accordance with Java application B.

In this eighth modification, mobile device MS, in the case of large data size for substantive data created by Java application A, for example, sends the substantive data to an external communications device for making that external communications device store the substantive data, and downloads the substantive data from that external communications device when it is used in operations executed in accordance with Java application B. As well, it can use not only data created by application A, but also data related to Java application A that is stored in an external communications device, by downloading the data from that external communications device when the data is used in operations executed in accordance with Java application B. Accordingly, in the eighth modification, mobile device MS can utilize efficiently its memory parts such as memory 214 with a limit capacity.

4.9: Ninth Modification

In a ninth modification, a mobile device MS determines the trustworthiness of e-mail, HTML data or data created in operations in accordance with a Java application, based on data indicating their sources, and on startup trusted source data or delivery trusted source data, in operations executed in accordance with OS instead of JAM.

4.10: Tenth Modification

In a tenth modification, mobile device MS can have various other configurations besides CLDC for J2ME, for example, a configuration like Connected Limited Device (CLD). As well, mobile device MS can have as profile the Mobile Information Device Profile (MIDP) and the like. Moreover, as a Java execution environment, instead of J2ME, it can have Java 2 Standard Edition (J2SE) and Java 2 Enterprise Edition (J2EE).

4.11: Eleventh Modification

In an eleventh modification, programs that perform various control functions and programs to construct a Java execution environment and the like can be installed in mobile device MS by operations of the user after the user obtains these programs from a storage media such as a CD-ROM, or through a communications network, instead of being pre-installed in ROM 212 of the mobile device MS at time of manufacture.

As well, mobile device MS, in addition to or instead of ROM 212, may have Erasable Programmable Read-Only Memory (EPROM) or the like, and overwrite programs previously stored with programs that may be acquired from a storage media such as a CD-ROM, or through a communications network, by user's operations.

4.12: Twelfth Modification

In a twelfth modification, the e-mail or HTML data sent to mobile device MS from IP server W may include, in addition to the startup tags and delivery tags, some indication of whether the data specifier specified by the delivery tags includes substantive data, and in the case where the data specifier indicates the URI of the substantive data, some indication of the size of that substantive data.

Mobile device MS displays the contents of these indications and the user, based on the information displayed, can decide whether to download substantive data that is indicated by data specifiers included in e-mail and the like. Accordingly, the user can infer, before download, the required time or the communications cost.

4.13: Thirteenth Modification

In a thirteenth modification, the mobile device MS, in the case where e-mail or HTML data includes an application specifier or a data specifier can, without starting a Java application specified by that application specifier, deliver data that has been specified by that data specifier to that Java application. As well, in the case where data created by a Java application is applicable data for the operations of another Java application, mobile device MS can, without starting that other Java application, deliver that data to that other Java application.

In the thirteen modification, for example, CPU 211, in accordance with JAM, directly stores data indicated by a data specifier included in e-mail, in application related data storage area 2141-$k2$ that corresponds to the delivered Java application. With this method, mobile device MS, even in the case where it can't simultaneously execute multiple Java applications, can perform delivery of data. Moreover, in the case where a data specifier is a URI or the like that indicates the storage location of substantive data, by operations of the CPU 211 of mobile device MS, the mailer delivers to WWW browser that URI or the like included in the data specifier, and, after WWW browser acquired substantive data based on that URI or the like, delivers that substantive data to JAM, and JAM stores that substantive data in application related data memory 2141-$k2$.

Moreover, in such cases where mobile device MS receives e-mail or HTML data that includes data delivered to Java application B by the mailer or browser, or in such cases where mobile device MS creates data to be delivered to Java application B in operations in accordance with a Java application other than Java application B, such as Java application A, in the situation that Java application B has been already started, as a matter of course, there is no need for mobile device MS to restart Java application B. As well, a mobile device MS in this thirteenth modification, in the case where another Java application is not started by information included in e-mail or the like, does not perform the decision whether to perform startup by startup trusted source data. Accordingly, in the case where mobile device MS takes the design of not performing startup of Java applications before it delivers data to the Java applications, mobile device MS may not have a startup trusted data source record.

4.14: Fourteenth Modification

In a fourteenth modification, instead of mobile device MS, another device may be used, such as a PC or PDA that can perform the transmitting and receiving of data through a network. In this case, instead of a mobile packet communications network MPN, a public digital network such as ISDN or the like, or a landline network, can be used.

4.15: Fifteenth Modification

In a fifteenth modification, in the ADF stored in mobile device MS, instead of startup trusted source data and delivery trusted source data, startup untrusted source data and delivery untrusted source data are included; this data may include mail addresses or URIs that indicate untrusted data sources.

Mobile device MS decides, based on startup untrusted source data and delivery untrusted source data, whether to use data included in e-mail or in HTML data, or data created by a Java application, in operations executed in accordance with another Java application.

In other words, in the case where startup untrusted source data includes an e-mail transmission origin address, a HTML data transmission origin URI, or a URI of the download origin of a Java application that instructed to created data, mobile device MS does not start another Java application specified by this data. As well, in the case where delivery untrusted source data includes an e-mail transmission origin address, a HTML data transmission origin URI, or a URI of the download origin of a Java application that instructed to create data, mobile device MS does not use this data in operations executed in accordance with another Java application.

With the fifteenth modification, because the mobile device MS does perform startup of Java applications or delivery of data to Java applications based on data from sources with limited trustworthiness, the information security for mobile device MS is assured similarly to the above embodiments.

4.16: Sixteenth Modification

In the above embodiments, in the case of delivery of data to another Java application, application B for example, of data created or acquired by a Java application, for example Java application A, mobile device MS compares the URI of the download origin of Java application A, that is delivery origin of the data, with startup trusted source data or delivery trusted source data of Java application B, that is delivery destination of the data, and decides whether to perform startup or data delivery.

In the sixteenth modification, in addition to the decisions taken by the above embodiments, or instead of them, mobile device MS decides whether to perform startup or data delivery by comparing the URI of the download origin of Java application B, that is delivery destination of the data, with the startup trusted source data or delivery trusted source data of Java application A, that is delivery origin of the data.

In the sixteenth modification, the information security of mobile device MS is assured by avoiding the undesirable situation where information, that was created by Java application A and the user wishes to keep private, is delivered to Java application B downloaded from an untrusted source, and mobile device MS sends the information to external communications devices in operations in accordance with Java application B.

4.17: Seventeenth Modification

In the above embodiments, the mobile device MS comprises CPU, ROM, RAM, nonvolatile memory, etc, that are composed by a general computer, and the CPU, due to performing operations executed in accordance with a program stored in the ROM, performs startup of a Java application or delivery of data to a Java application.

In the seventeenth modification, mobile device MS comprises multiple processors, and those multiple processors share operations of various decisions, operations of startup of applications and operations of processing data, that are performed by the CPU in the above embodiments. In this case, the processors may be general-purpose processors, and may be special-purpose processors to implement above-mentioned operations of the mobile device MS according to this invention.

The invention claimed is:

1. An electronic device comprising:
a memory configured to store a mailer application and a second application, wherein the memory is further configured to store an application management table including information specifying the second application and a memory address indicating a memory area of the memory in which the second application is stored;
the memory is further configured to store delivery-trusted source data related to the second application, wherein the delivery-trusted source data is indicative of an electronic message address that is trusted; and
a processor in communication with the memory, wherein the processor is configured to execute the mailer application to receive delivery data attached in an electronic message, the processor further configured to compare a source address of the received electronic message with the stored delivery-trusted source data to determine whether delivery of the delivery data is permissible; and
in response to determination that at least some portion of the source address corresponds to at least a portion of the delivery-trusted source data, the processor is further configured to deliver the delivery data to the second application; and
after delivery of the delivery data to the second application, the processor is further configured to execute the second application stored in the memory area to utilize the delivery data.

2. An electronic device comprising:
a memory configured to store a browser application and a second application; wherein
the memory is further configured to store an application management table including information specifying the second application and a memory address indicating a memory area in the memory in which the second application is stored;
the memory is further configured to store delivery-trusted source data related to the second application, wherein the delivery-trusted source data is indicative of a URI (Uniform Resource Indicator) that is trusted; and
a processor in communication with the memory, wherein the processor is configured to execute the browser application to receive delivery data designated with an HTML (Hyper Text Markup Language) tag described in HTML data, and compare a source URI of the received HTML data with the delivery-trusted source data to determine whether delivery of the delivery data is permissible; and
in response to determination that at least a portion of the source URI corresponds to a portion of the delivery-trusted source data, the processor is further configured to deliver the delivery data to the second application; and after delivery of the delivery data to the second application, the processor is further configured to execute the second application stored in the memory area to utilize the delivery data.

3. An electronic device comprising:
a memory configured to store a first application and a second application, delivery data is generated by the first application; wherein
the memory is further configured to store an application management table including a source URI (Uniform Resource Indicator) of a file corresponding to the first application and memory addresses indicating respective memory areas of the memory in which the first application and the second application are stored;
the memory is further configured to store delivery-trusted source data related to the second application, wherein the delivery-trusted source data is indicative of a URI that is trusted; and
a processor in communication with the memory, wherein the processor is configured to compare the source URI with the delivery-trusted source data to determine whether delivery to the second application of the delivery data generated by the first application is permissible; and
in response to determination that at least a portion of the source URI corresponds to at least a portion of the delivery-trusted source data, the processor is further configured to deliver the delivery data to the second application; and
after delivery of the delivery data to the second application, the processor is further configured to execute an operation with the second application stored in the memory area to utilize the delivery data.

4. The electronic device of claim 1, wherein:
the delivery-trusted source data and the second application are stored in the memory in an integrated form.

5. The electronic device of claim 2, wherein:
the delivery-trusted source data and the second application are stored in the memory in an integrated form.

6. The electronic device of claim 3, wherein:
the delivery-trusted source data and the second application are stored in the memory in an integrated form.

7. The electronic device of claim 1, wherein
the memory is further configured to store a flag, wherein the flag distinguishes a native application from a non-native application, the native application being an application stored in a read only memory part of the memory; and
wherein the delivery of the delivery data is permissible if the flag shows that the second application is the native application.

8. The electronic device of claim 2, wherein
the memory is further configured to store a flag, wherein the flag distinguishes a native application from a non-native application, the native application being an application stored in a read only memory part of the memory; and
wherein the delivery of the delivery data is permissible if the flag shows that the second application is the native application.

9. The electronic device of claim 3, wherein
the memory is further configured to store a flag, wherein the flag distinguishes a native application from a non-native application, the native application being an application stored in a read only memory part of the memory; and
wherein the delivery of the delivery data is permissible if the flag shows that the second application is the native application.

10. The electronic device of claim 1, further comprising:
a receiver unit in communication with the processor, the receiver unit configured to communicate with a communication network, wherein the receiver unit is further configured to receive through the communication network the second application.

11. The electronic device of claim 2, further comprising:
a receiver unit in communication with the processor, the receiver unit configured to communicate with a communication network, wherein the receiver unit is further configured to receive through the communication network the second application.

12. The electronic device of claim 3, further comprising:
a receiver unit in communication with the processor, the receiver unit configured to communicate with a communication network, wherein the receiver unit is further configured to receive through the communication network the second application.

13. The electronic device of claim 10, wherein:
the receiver unit is further configured to receive the electronic message as a function of execution of the mailer application with the processor.

14. The electronic device of claim 11, wherein:
the receiver unit is further configured to receive the HTML data as a function of execution of the browser application with the processor.

15. The electronic device of claim 1, wherein:
the memory is further configured to store startup-trusted source data related to the second application, wherein the startup-trusted source data is indicative of the electronic message address that is trusted,
the processor is further configured to determine whether the received electronic message includes a startup instruction, wherein the startup instruction instructs the processor to start execution of the second application;
in response to determination that the received electronic message includes the startup instruction, the processor is further configured to compare the source address of the received electronic message with the startup-trusted source data to determine whether starting execution of the second application is permissible; and
in response to determination that at least a portion of the source address corresponds to at least a portion of the startup-trusted source data, the processor is further configured to start execution of the second application.

16. The electronic device of claim 2, wherein:
the memory is further configured to store startup-trusted source data related to the second application, wherein the startup-trusted source data is indicative of the electronic message address that is trusted,
the processor is further configured to determine whether the received HTML data includes a startup instruction, wherein the startup instruction instructs the processor to start execution of the second application;
in response to determination that the received electronic message includes the startup instruction, the processor is further configured to compare the source URI of the received HTML data with the startup-trusted source data to determine whether starting execution of the second application is permissible;
in response to determination that at least a portion of the source address corresponds to at least a portion of the startup-trusted source data, the processor is further configured to start execution of the second application.

17. A method of managing applications in an electronic device comprising:
   providing a mailer application and a second application stored in a memory storage device included in the electronic device;
   storing an application management table in the memory storage device, the application management table including information specifying the second application and a memory address indicating a memory area of the memory storage device in which the second application is stored;
   storing delivery-trusted source data related to the second application in the memory storage device, wherein the delivery-trusted source data is indicative of an electronic message address that is trusted;
   executing the mailer application with a processor included in the electronic device to receive delivery data attached in an electronic message;
   the processor comparing a source address of the received electronic message with the stored delivery-trusted source data to determine whether delivery of the delivery data is permissible;
   the processor delivering the delivery data to the second application when the processor determines that at least some portion of the source address corresponds to at least a portion of the delivery-trusted source data; and
   after delivery of the delivery data to the second application, the processor executing the second application to utilize the delivery data.

18. A method of managing applications in an electronic device comprising:
   storing a browser application and a second application in a memory storage device of the electronic device;
   storing an application management table in the memory storage device, the application management table including information specifying the second application and a memory address indicating a memory area in the memory storage device in which the second application is stored;
   storing delivery-trusted source data related to the second application in the memory storage device, the delivery-trusted source data being indicative of a URI (Uniform Resource Indicator) that is trusted;
   executing the browser application with a processor included in the electronic device to receive delivery data designated with an HTML (Hyper Text Markup Language) tag described in HTML data;
   comparing a source URI of the received HTML data with the delivery-trusted source data to determine whether delivery of the delivery data is permissible;
   the processor delivering the delivery data to the second application when at least a portion of the source URI corresponds to at least a portion of the delivery-trusted source data; and
   executing the second application stored in the memory area with the processor to utilize the delivery data after delivery of the delivery data to the second application.

19. A method of managing applications in an electronic device comprising:
   storing a first application and a second application in a memory storage device included in the electronic device,
   storing in the memory storage device an application management table, the application management table including a source URI (Uniform Resource Indicator) of a file corresponding to the first application and memory addresses indicating respective memory areas of the memory storage device in which the first application and the second application are stored;
   storing delivery-trusted source data related to the second application in the memory storage device, wherein the delivery-trusted source data is indicative of a URI that is trusted;
   generating delivery data by execution of the first application with a processor included in the electronic device;
   the processor comparing the source URI with the delivery-trusted source data to determine whether delivery to the second application of the delivery data generated by the first application is permissible;
   delivering the delivery data to the second application with the processor when at least a portion of the source URI corresponds to at least a portion of the delivery-trusted source data; and
   the processor executing an operation with the second application stored in the memory area to utilize the delivery data after delivery of the delivery data to the second application.

* * * * *

UNITED STATES PATENT AND TRADEMARK OFFICE
CERTIFICATE OF CORRECTION

| | | |
|---|---|---|
| PATENT NO. | : 8,418,253 B2 | Page 1 of 1 |
| APPLICATION NO. | : 10/515399 | |
| DATED | : April 9, 2013 | |
| INVENTOR(S) | : Kamiya et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 928 days.

Signed and Sealed this
Fourth Day of March, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,418,253 B2 | Page 1 of 1 |
| APPLICATION NO. | : 10/515399 | |
| DATED | : April 9, 2013 | |
| INVENTOR(S) | : Kamiya et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1054 days.

Signed and Sealed this
Eleventh Day of August, 2015

Michelle K. Lee
*Director of the United States Patent and Trademark Office*